United States Patent
Lu et al.

(10) Patent No.: US 12,553,028 B2
(45) Date of Patent: Feb. 17, 2026

(54) METHOD TO GENERATE INDUCED OLIGODENDROCYTE-LINEAGE CELLS AND TREATMENT USING SUCH CELLS

(71) Applicant: ACADEMIA SINICA, Taipei (TW)

(72) Inventors: Joyce Jean Lu, Taipei (TW); Hsiao-Chun Huang, Taipei (TW); Pei-Lun Lai, New Taipei (TW); Chi-Hou Ng, Taipei (TW)

(73) Assignee: ACADEMIA SINICA, Taipei (TW)

( * ) Notice: Subject to any disclaimer, the term of this patent is extended or adjusted under 35 U.S.C. 154(b) by 649 days.

(21) Appl. No.: 17/251,335

(22) PCT Filed: Jun. 14, 2019

(86) PCT No.: PCT/US2019/037167
§ 371 (c)(1),
(2) Date: Dec. 11, 2020

(87) PCT Pub. No.: WO2019/241620
PCT Pub. Date: Dec. 19, 2019

(65) Prior Publication Data
US 2021/0246422 A1    Aug. 12, 2021

Related U.S. Application Data

(60) Provisional application No. 62/684,963, filed on Jun. 14, 2018.

(51) Int. Cl.
C12N 5/079 (2010.01)
A61K 35/30 (2015.01)

(52) U.S. Cl.
CPC ........... *C12N 5/0622* (2013.01); *A61K 35/30* (2013.01); *C12N 2501/01* (2013.01); *C12N 2501/727* (2013.01); *C12N 2501/73* (2013.01); *C12N 2501/999* (2013.01); *C12N 2506/1307* (2013.01)

(58) Field of Classification Search
CPC .......... C12N 5/0622; C12N 2506/1307; C12N 2501/065
See application file for complete search history.

(56) References Cited

U.S. PATENT DOCUMENTS

| | | | |
|---|---|---|---|
| 2009/0191159 A1 | 7/2009 | Sakurada et al. | |
| 2016/0244720 A1* | 8/2016 | Lu | A61K 45/06 |
| 2016/0250260 A1* | 9/2016 | Lin | A61K 31/222 |
| | | | 424/93.7 |
| 2017/0183627 A1 | 6/2017 | Fossati et al. | |

FOREIGN PATENT DOCUMENTS

WO    WO2017/062374 A1    4/2017

OTHER PUBLICATIONS

Dimberg et al (Retinoic acid-induced cell cycle arrest of human myeloid cell lines is associated with sequential down-regulation of c-Myc and cyclin E and posttranscriptional up-regulation of p27Kip1. Blood, vol. 99, 2002). (Year: 2002).*
Selleckchem SU9516 (Catalog No. S7636 (Year: 2001).*
Lane et al. Cancer Res. 2001, 61(16), 6170-6177 (Year: 2001).*
Selleckchem Forskolin (Catalog No. S2449 (Year: 2003).*
Insel et al. Cell Mol Neurobiol, 2003, 23(3), 305-314 (Year: 2003).*
Wang et al (Retinoic acid induces CDK inhibitors and growth arrest specific (Gas) genes in neural crest cells. Develop. Growth Differ. (2005) 47, 119-130 Blackwell). (Year: 2005).*
Layers of the Skin, National Cancer Institute <https://training.seer.cancer.gov/melanoma/anatomy/layers.html> (Year: 2025).*
Vigil et al (ROCK1 and ROCK2 Are Required for Non-Small Cell Lung Cancer Anchorage-Independent Growth and Invasion. Cancer Res; 72(20) Oct. 15, 2012) (Year: 2012).*
Witkowski et al (Y-27632 acts beyond ROCK inhibition to maintain epidermal stem-like cells in culture. Journal of Cell Science (2023 (Year: 2023).*
International Search Report for PCT/US2019/037167 mailed on Sep. 9, 2019.
Written Opinion of the International Searching Authority for PCT/US2019/037167 mailed on Sep. 9, 2019.

* cited by examiner

*Primary Examiner* — Emily A Cordas
*Assistant Examiner* — Matasha Dhar
(74) *Attorney, Agent, or Firm* — Birch, Stewart, Kolasch & Birch, LLP

(57) ABSTRACT

The present invention generally relates to a method for generating induced oligodendrocyte-lineage cells (induced OLGs) and treatment using such cells. The induced OLGs are useful in cell therapy, in particular for demyelinating diseases.

16 Claims, 23 Drawing Sheets

Fig. 6A (Cont')
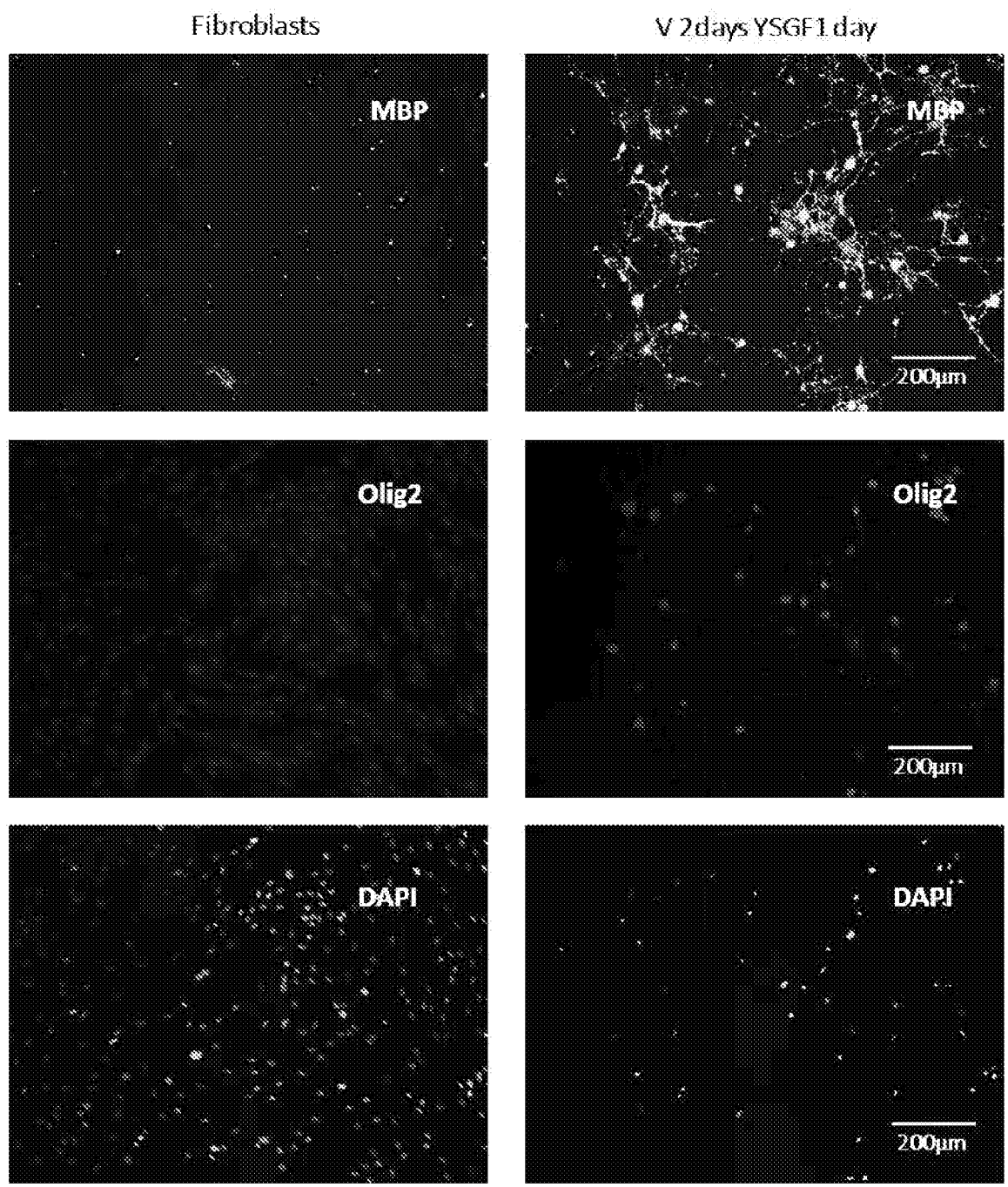

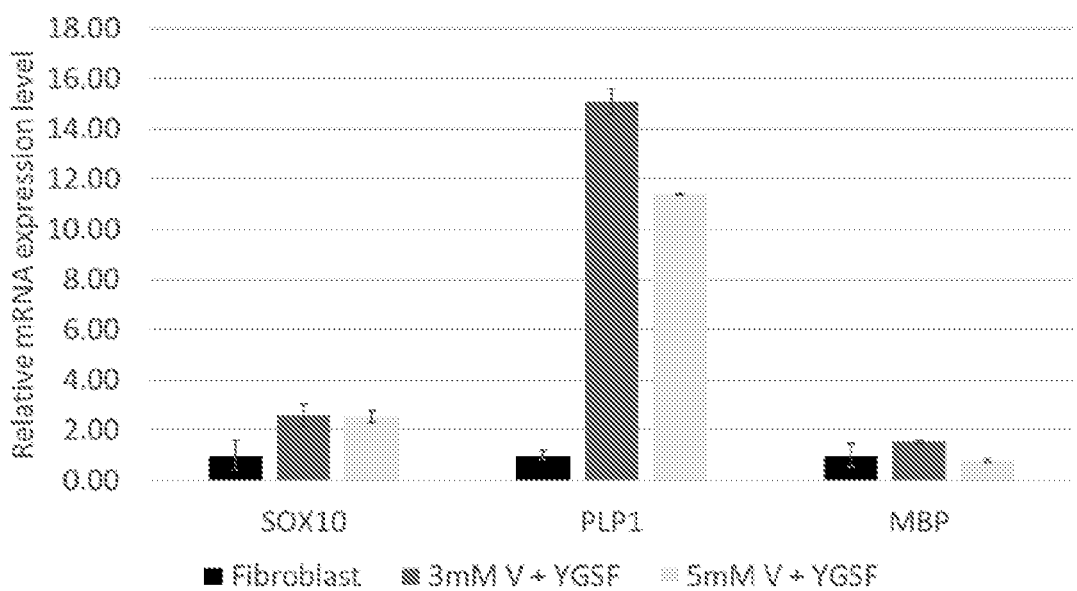

Fig. 9A (Cont')
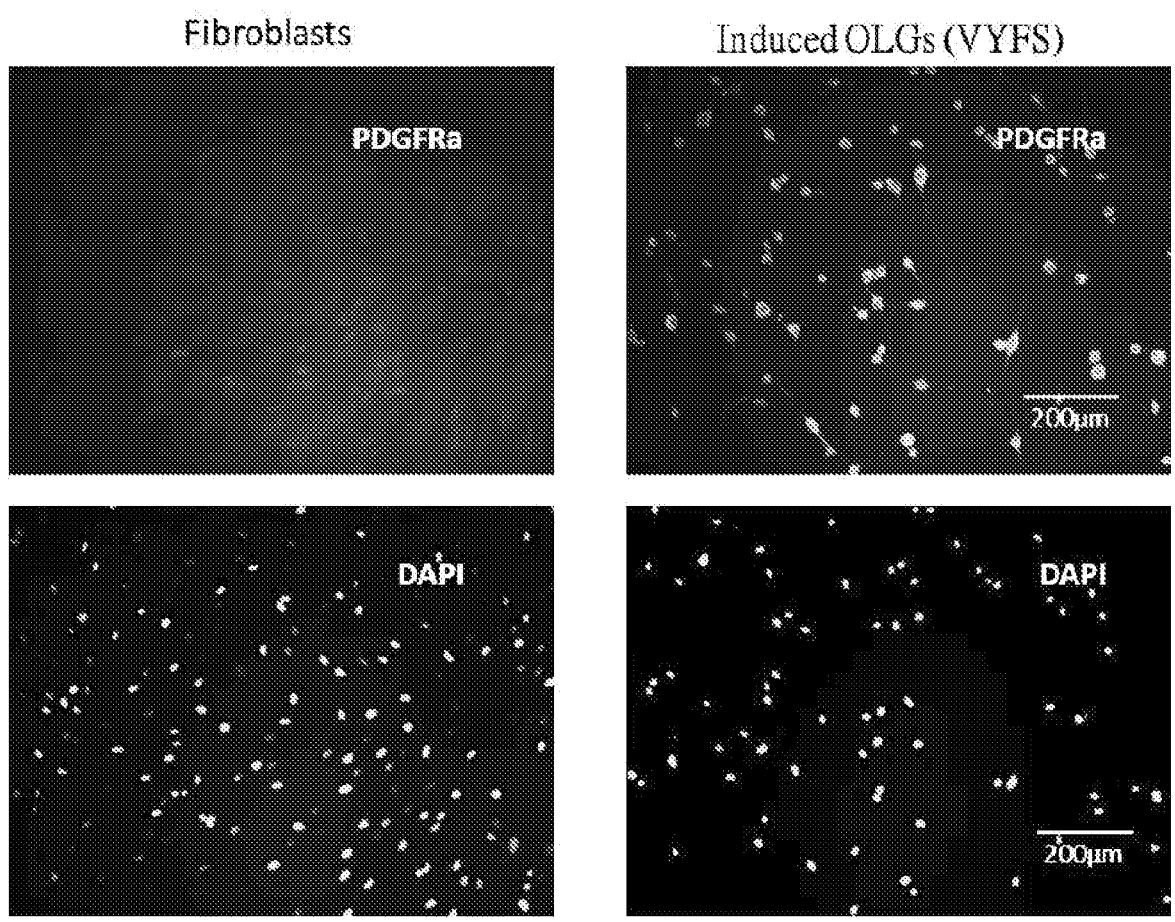

Fig. 9B  Fibroblasts  Induced OLGs (VYFS)
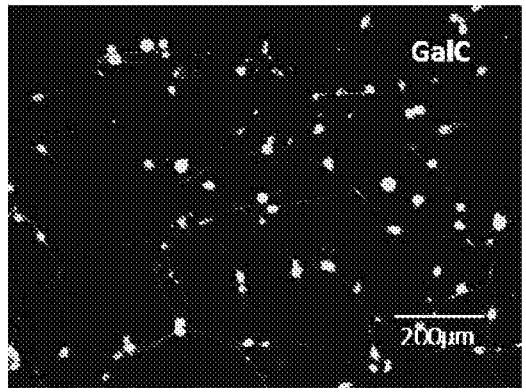
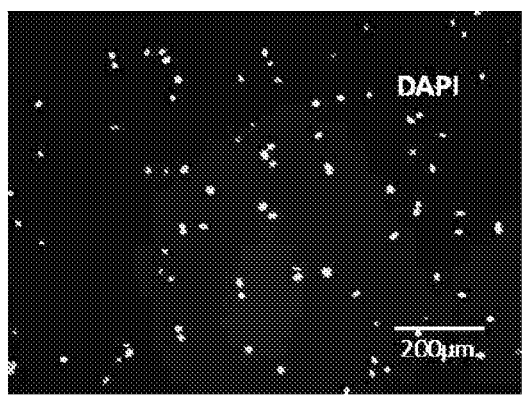
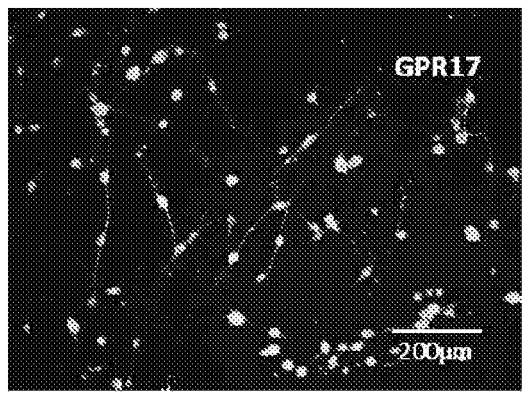
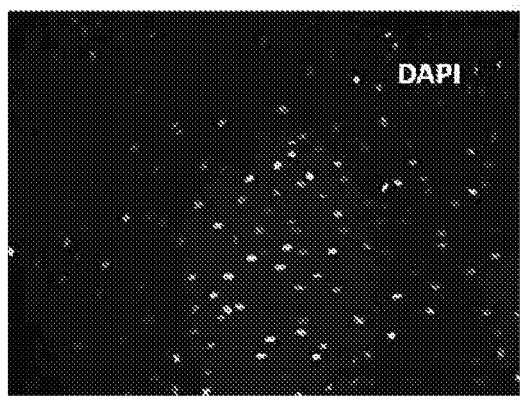
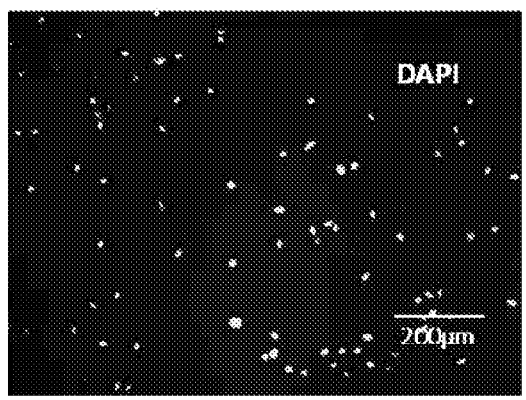

Fig. 9B (Cont')
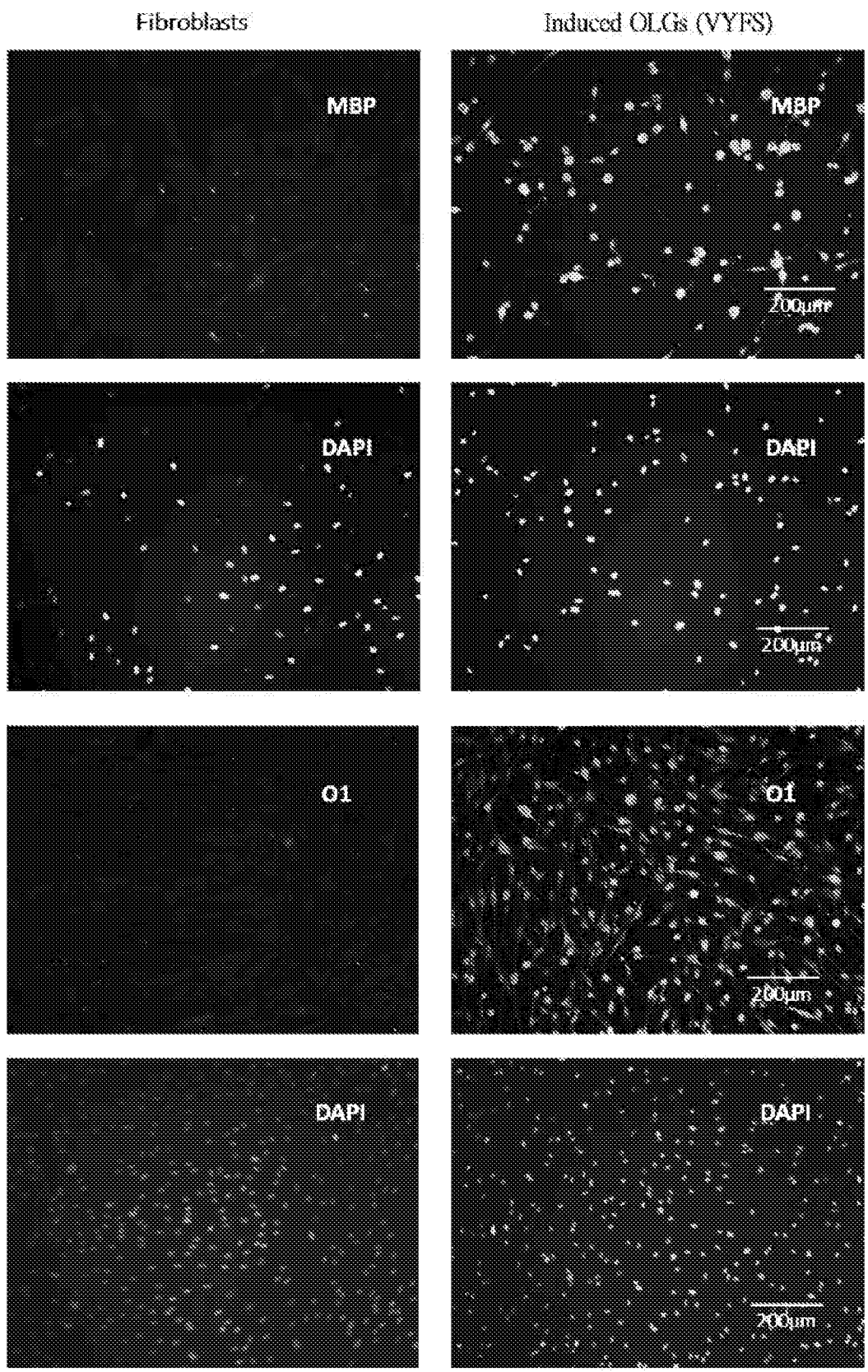

METHOD TO GENERATE INDUCED OLIGODENDROCYTE-LINEAGE CELLS AND TREATMENT USING SUCH CELLS

RELATED APPLICATIONS

This application is the National Phase of PCT International Application No. PCT/US2019/037167, filed on Jun. 14, 2019, which claims priority under 35 U.S.C. 119(e) to U.S. Provisional Application No. 62/684,963, filed on Jun. 14, 2018, all of which are hereby expressly incorporated by reference into the present application.

TECHNOLOGY FIELD

The present invention generally relates to a method for generating induced oligodendrocyte-lineage cells (induced OLGs) and treatment using such cells.

BACKGROUND OF THE INVENTION

The nervous system is essential for transmitting signals to control voluntary and involuntary behavior. The nervous system controls muscle activity, coordinates different tissues and organs, and receives information. Neurons transmit transient signals and fast signals to sense environmental changes and react. The nervous system of vertebrates is divided into the central nervous system (CNS) and the peripheral nervous system (PNS). CNS includes the brain and spinal cord, while PNS includes muscle and glands[1]. The CNS integrates and coordinates all information received from different parts of the body. The central nervous system can be divided into gray matter and white matter, the gray matter is composed of neurons and unmyelinated nerve fibers, while the white matter is composed of myelinated axons and oligodendrocytes[2]. The retina, optic nerve, olfactory nerves and olfactory epithelium are considered as parts of CNS, which have synapses directly link to the brain.

CNS and PNS have different types of neurons and support cells. The central nervous system is mainly composed of nerve cells and glial cells. The glial cell is the most abundant cell type in the CNS. As counted by the nucleus, the number of glial cells is about 10 times more than the nerve cells; by volume, glial cells and nerve cells are both occupy about half of the brain. Nerve cells are surrounded by glial cells and interact with each other. Glial cells in the central nervous system mainly include astroglial cells, oligodendroglial cells (oligodendrocyte-lineage cells), and microglial cells[3, 4]. Whereas in PNS, Schwann cells and satellite cells play the same role. Glia cells in CNS have different functions[5, 6]. For instance, the astrocytes (also called astroglia), a group of star-shaped glial cells, provide biochemical support and nutrient to nervous tissue, and maintenance of extracellular ion balance. As for the microglia, the residential macrophage, it can active immune functions to clear plaques, infectious agents, and unnecessary neurons 3. Other cell types, such as oligodendrocytes, are crucial for myelination.

The oligodendrocyte precursor/progenitors cells (OPCs) differentiate into oligodendrocyte after the neurogenic/gliogenic switch[3]. Oligodendrocytes (also called oligodendroglia), a type of neuroglia, function mainly by providing supports and insulation to nerve axons. Oligodendrocytes generate myelin sheath to wrap around the axons for insulation and increase electrical conduction, oligodendrocytes performing an equivalent function as Schwann cells in PNS 3. Regarding myelination, one oligodendrocyte can wrap about 50 axons, but it can only form one segment of myelin sheath to each axon. The nerve impulses travel 100 times faster in myelinated axon while comparing to non-myelinated neurons[7]. In addition, oligodendrocyte-lineage cells help neural regeneration by offering nutrient and proper environment. Major participants in the process of myelination include the proteins of myelin basic protein (MBP), myelin oligodendrocyte glycoprotein (MOG) and proteolipid protein (PLP). Moreover, surface antigen O4, transcription factor Olig2 and Nkx2.2 are expressed in oligodendrocyte lineage cells (OLGs)[8].

CNS diseases are diseases that affect the spinal cord or the brain. Depending on the damaged area, brain or spinal cord injury result in different disabilities. CNS injury caused by structural defects originated from stroke, infections, degeneration and autoimmune disorder. Among them, an autoimmune disorder caused by loss of tolerance to autologous proteins in the body, which lead the immune system to attack and destroy the body tissue. Damages of neurons or loss of function of neural supporter cells in different parts of the CNS result in different diseases. The cause of demyelinating disease can be divided into five categories: viral, immune, genetic, toxic and injured. Demyelinating disease results from myelin sheath damage in the nervous system and occurs in both CNS and PNS. Myelin loss or dysfunction affects 2-2.5 million of people all over the world. It leads to substantial morbidity and mortality[9]. Several diseases belong to the inflammatory demyelinating disease in CNS: multiple sclerosis (MS), acute hemorrhagic leukoencephalitis (AHL), and acute-disseminated encephalomyelitis (ADEM), central pontine myelinolysis, progressive multifocal leukoencephalopathy, cerebral palsy, congenital leukodystrophies.[10, 11] Among the diseases, MS is a common autoimmune disorder in which the immune system attacks the myelin sheath or loss of OLGs and causes systematic demyelination[12-14]. The symptoms of MS, depend on damage region can lead to symptoms of vision, bladder, memory/thinking, pain, spasms, speech problem and swallowing. Moreover, MS can also lead to stroke, myasthenia or death in serious situations[15]. MS has a relapsing and remitting course that continues after remission. The latent phase between relapsing and remitting course is unpredictable, and it can take many years[16]. Other neuron diseases also involve in demyelination, such as Huntingtin's disease and schizophrenia. Huntingtin's disease caused by the increase of CAG repeat (polyglutamine tract) in the Huntingtin protein. It is an autosomal dominant neurodegenerative disease [17]. Several reports mentioned that in brain of Huntingtin's disease's patients, glial cells are degenerated and pathological phenotype was observed[18-22]. Myelin breakdown and damage are present in pre-symptomatic Huntingtin's disease's patients[20, 22, 23]. Moreover, demyelination has been reported in multiple Huntingtin disease mouse models[24-26]. In addition, radiation therapy also generates demyelinating diseases in human and mouse model[27-29], and it is possible be treated with oligodendrocyte progenitors[30].

Cell therapy is a potential and promising treatment strategy for demyelinating diseases[12-14]. Currently, there are about 115 clinical trials are examining the efficacy of glial cell-related therapy. Several studies injected normal OLGs into the damaged areas to ensheath the demyelinated region and have promising results[31-33]. However, it is hard to obtain sufficient human primary OLGs for the cell therapy[31-33]. Thus, providing sufficient amounts of OLGs is the major hurdle that needs to be resolved. Nowadays, human embryonic stem cells (hESCs) and induced pluripotent stem cells (iPSCs) provide a platform for obtaining the functional OLGs after ectopic expression of transcription factors or stepwise differentiation by soluble factors[34-36]. Currently, hESCs derived-NSCs or MSC derived-OLGs already can improve the symptoms of MS in animal experiments[37,38]. Nevertheless, hESCs and iPSCs have disadvantages such as the risk of teratoma[39]. Moreover, the differentiation process is labor consuming, high cost, and required 45 days. On the other hand, only mouse or rat OLGs, but not human, can be derived from fibroblasts with transcription factor virus transduction which has the risk of insertion mutagenesis[40,41] In addition, transcription factor base reprogramming in rodent cells merely reaches the efficiency of 9.2% or 15.6% cells expressed 04 marker.

In this invention, it is disclosed for the first time that induced oligodendrocyte-lineage cells (induced OLGs) can be successfully generated by exposing skin cells e.g. fibroblasts to a chemical inducer including a Rho-associated protein kinase (ROCK) inhibitor together with one or more auxiliary agents selected from the group consisting of a histone deacetylase (HDAC) inhibitor, a cyclin-dependent kinase (CDK) inhibitor, a protein kinase C (PKC) inhibitor, and a cyclic adenosine monophosphate (cAMP) activator. According to the present invention, skin cells e.g. fibroblasts after such treatment can be reprogramed into induced OLGs which are useful in cell therapy, in particular for demyelinating diseases.

Therefore, in one aspect, the present invention particularly provides a method of generating induced OLGs, comprising culturing skin cells in a condition which allows a proportion of the skin cells to reprogramming into induced OLGs, wherein the condition comprises a culture medium which comprises a chemical inducer including a Rho-associated protein kinase (ROCK) inhibitor, wherein the skin cells are also treated with an auxiliary agent selected from the group consisting of a histone deacetylase (HDAC) inhibitor, a cyclin-dependent kinase (CDK) inhibitor, a protein kinase C (PKC) inhibitor, a cyclic adenosine monophosphate (cAMP) activator, and any combination thereof.

In some embodiments, the skin cells are fibroblasts.

In some embodiments, the auxiliary agent includes the CDK inhibitor.

In some embodiments, the auxiliary agent includes the HDAC inhibitor and the cAMP activator, optionally with the CDK inhibitor.

In some embodiments, the chemical inducer and the auxiliary agent(s) are simultaneously or successively added to the culture medium. In certain examples, the auxiliary agent(s) is added to the culture medium before the chemical inducer. In certain examples, the HDAC inhibitor is added to the culture medium before the ROCK inhibitor.

In some embodiments, the chemical inducer and/or the auxiliary agent(s) are small molecules.

In some embodiments, the chemical inducer includes Y27632. In some embodiments, the auxiliary agent includes forskolin (FSK), SU9516, VPA, and/or G06983.

In some embodiments, the induced OLGs express a cell marker selected from the group consisting of platelet-derived growth factor receptor (PDGFR), myelin basic protein (MBP), oligodendrocyte transcription factor (Oligo2), SOX10, proteolipid protein (PLP) 1, A2B5, O4, and any combination thereof.

In some embodiments, the method of the invention further comprises isolating the induced OLGs from the cell culture to obtain an isolated population of induced OLGs.

In a further aspect, the present invention provides an isolated population of induced OLGs as described herein.

In still an additional aspect, the present invention provides a method for treating a disease or disorder, comprising administering a therapeutically effective amount of induced OLGs to a subject in need of such treatment. Specifically, the induced OLGs are derived from skin cells via treatment with a chemical inducer including a Rho-associated protein kinase (ROCK) inhibitor, wherein the skin cells are further treated with one or more auxiliary agents selected from the group consisting of a histone deacetylase (HDAC) inhibitor, a cyclin-dependent kinase (CDK) inhibitor, a protein kinase C (PKC) inhibitor, and a cyclic adenosine monophosphate (cAMP) activator. In some embodiments, the auxiliary agent includes the CDK inhibitor. In some examples, the auxiliary agent(s) includes the HDAC inhibitor and the cAMP activator, optionally with the CDK inhibitor. Also provided is use of induced OLGs as described herein in the manufacture of a medicament for treating a disease or disorder.

In some embodiments, the disease or disorder is associated with oligodendrocyte dysfunction.

In some embodiments, the disease or disorder is a demyelinating disease.

In some embodiments, the induced OLGs are administered in an amount effective in promoting myelination of neurons in the subject.

In some embodiments, the disease or disorder is selected from the group consisting of multiple sclerosis (MS), acute hemorrhagic inflammatory disease (AHL), cerebral palsy, acute-disseminated encephalomyelitis (ADEM), central pontine myelinolysis, progressive multifocal leukoencephalopathy, congenital leukodystrophies, Parkinson's disease, Huntington's disease, schizophrenia, and demyelinating diseases caused by radiation therapy.

Also provided is a pharmaceutical composition comprising a therapeutically effective amount of induced OLGs as described herein and a pharmaceutically acceptable carrier.

Further provided is a culture comprising skin cells and a culture medium which comprises a chemical inducer and one or more auxiliary agents as described herein. In particular, the culture further comprises induced OLGs derived from the skin cells.

The details of one or more embodiments of the invention are set forth in the description below. Other features or advantages of the present invention will be apparent from the following detailed description of several embodiments, and also from the appending claims.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2A shows that Y27632 (Y) and SU9516 (S) converted fibroblasts into OLGs with dendritic morphology. FIG. 2B shows that fluorescent staining showed the expression of oligodendrocyte-specific marker (O4) on the induced cells. DAPI (4′,6-diamidino-2-phenylindole) was used to stain the nucleus.

FIG. 4A shows that 2 days of pre-treatment with VPA can improve the efficiency of the conversion efficiency. FIG. 4B shows that oligodendrocyte-specific marker, O4, was detected by fluorescent staining on the induced cells. DAPI was used to stain the nucleus. V: VPA, Y: Y27632, S: SU9516, G: Go6983.

FIG. 6B shows that qPCR showed the increase of oligodendrocyte specific genes. mRNA expression show the transcription factor SOX10, myelination protein MBP and PLP1 were upregulated in induced cells in comparison to the fibroblasts.

FIG. 9B shows that. iOLGs expressed oligodendrocyte marker in comparison to fibroblasts. The cells are induce by chemical cocktail (4C, VYSF). The data showed the iOLGs expressed oligodendrocyte specific marker GalC, GPR17, MBP and O1.

FIG. 12A shows that A2B5 expression was increased in induced OLGs while comparing to fibroblasts. FIG. 12B shows that O4 expression was increased in induced OLGs while comparing to fibroblasts. FIG. 12C shows that the quantification results of A2B5 and O4 expression by flow cytometry.

FIG. 13A shows that mocetinostat and Pracinostat could replace VPA and induce fibroblasts reprogrammed into a much more mature morphology of induced OLGs. FIG. 13B shows that the immunofluorescence staining showed that the cell induced by Mocetinostat and Pracinostat have stronger expression of oligodendrocyte markers O4 and MBP.

FIG. 14A shows that oligodendrocyte maker A2B5 was quantified by flow cytometry. Compared with fibroblasts, cells treated with 3C (VPA, forskolin, Y27632) increased A2B5 expression. Cells treated with 4C (VPA, forskolin, Y27632, SU9516) were served as positive control. FIG. 14B shows that the immunofluorescence staining showed that cells treated with 3C upregulated OLG transcriptional factor Olig2. Cells treated with 4C were served as positive control.

DETAILED DESCRIPTION OF THE INVENTION

Figure 1A:
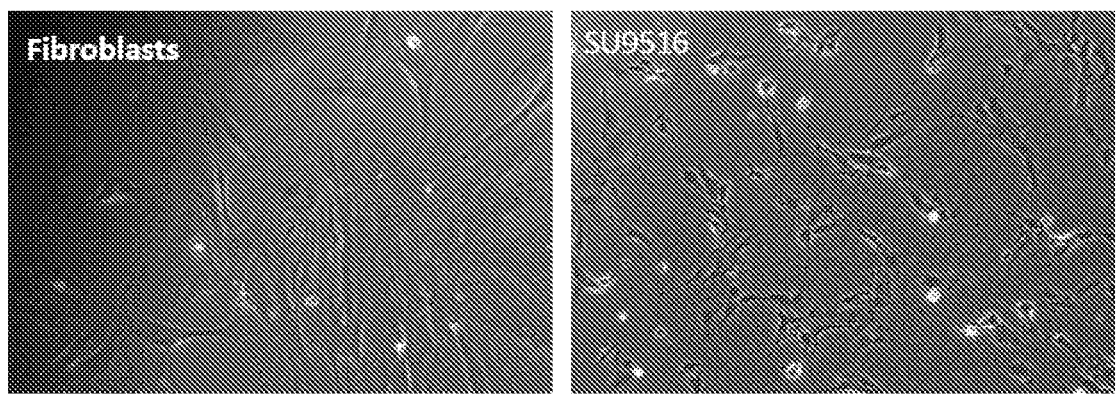
FIG. 1A-1B show that SU9516 and Y27632 induced morphological change in human primary skin fibroblasts. SU9516 induced the domed-shape morphology (FIG. 1A), while Y27632 triggered the dendritic-like morphological change (FIG. 1).

Unless defined otherwise, all technical and scientific terms used herein have the same meaning as commonly understood by a person skilled in the art to which this invention belongs.

1. Definitions

As used herein, the singular forms "a", "an", and "the" include plural referents unless the context clearly dictates otherwise. Thus, for example, reference to "a component" includes a plurality of such components and equivalents thereof known to those skilled in the art.

The term "comprise" or "comprising" is generally used in the sense of include/including which means permitting the presence of one or more features, ingredients or components. The term "comprise" or "comprising" encompasses the term "consists" or "consisting of."

As used herein, the term "oligodendrocyte-lineage cells (OLGs)" can include oligodendrocytes, pro-oligodendroblasts and oligodendrocyte precursor/progenitors cells (OPCs). Oligodendrocytes in the CNS produce myelin sheath that wraps the neuronal axons for insulation and increasing electrical conduction and also important for axonal integrity and survival.

As used herein, the term "induced oligodendrocyte-lineage cells (induced OLGs)" refers to OLG-like cells (i.e. cells having OLG-like features) which are generated (or reprogramed) from other cell types, like skin cells.

As used herein, "skin cells" means cells found in skin such as epithelial cells or fibroblasts.

As used herein, the term "reprogram" refers to a process that converts cells into different cell types with some different properties or biological functions.

As used herein, the term "culture" refers to a group of cells incubated with a medium and preferably maintained the cell survival or let the cell grow.

The term "small molecule" as used herein refers to organic or inorganic molecules either synthesized or found in nature, generally having a molecular weight less than 10,000 grams per mole, particularly less than 5,000 grams per mole, particularly less than 2,000 grams per mole, and particularly less than 1,000 grams per mole. In some embodiments, a small molecule refers to a non-polymeric, e.g. non-protein or nucleic acid based, chemical molecule.

The term "about" as used herein means plus or minus 10% of the numerical value of the number with which it is being used. Therefore, about 1% means in the range of 0.9% to 1.1%.

As used herein, a Rho-associated protein kinase (ROCK) inhibitor can refer to an agent that downregulates, decreases or suppresses the amount and/or activity of Rho-associated protein kinase. Examples of ROCK inhibitors as described herein include, but are not limited to, Y-27632, AS 1892802, GSK 269962, GSK 429286, H 1152 dihydrochloride, HA 1100 hydrochloride, OXA 06 dihydrochloride, RKI 1447 dihydrochloride, SB 772077B dihydrochloride, etc.

As used herein, a cyclin-dependent kinase (CDK) inhibitor can refer to an agent that downregulates, decreases or suppresses the amount and/or activity of cyclin-dependent kinase. Examples of CDK inhibitors as described herein include, but are not limited to, SU9516, PD-0332991, Roscovitine, SNS-032, Dinaciclib, Flavopiridol, AT7519, Flavopiridol, JNJ-7706621, AZD5438, MK-8776, PHA-793887, BS-181, Palbociclib (PD0332991) Isethionate, A-674563, abemaciclib, BMS-265246, PHA-767491, Milciclib, R547, NU6027, P276-00, MSC2530818, Senexin A, LY2857785, LDC4297, ON123300, Kenpaullone, K03861, THZ1 2HCl, AT7519 HCl, Purvalanol A, Ro-3306, XL413, LDC000067, ML167, TG003, Ribociclib, Wogonin, BIO, AZD1080, 1-Azakenpullone, and others.

As used herein, a cyclic adenosine monophosphate (cAMP) activator can refer to an agent that increases intracellular levels of cAMP as compared to the background physiological intracellular level when the agent is absent. Examples of cAMP activators include, but are not limited to, forskolin, rolipram, NKH477, PACAP1-27, PACAP1-38 and others.

As used herein, a protein kinase C (PKC) inhibitor can refer to an agent that downregulates, decreases or suppresses the amount and/or activity of PKC kinase. Examples of PKC inhibitors as described herein include, but are not limited to, Go6976, Go66850, Go6983, rottlerin, bisindolylmaleimide II, C-1, calphostin C, melittin, GF 109203X, dihydrosphingosine, chelerythrine, chloride, CGP 53353, CID 2858522, Dihydrosphingosine, GF 109203X, Go 6976, Go 6983, [Ala107]-MBP (104-118), Ala$^{113}$]-MBP (104-118), (±)-Palmitoylcarnitine chloride, PKC (19-36) (pseudosubstrate peptide; inhibitor of PKC), PKC 412, PKC pseudo substrate, Ro 32-O432 hydrochloride, rottlerin, D-erythro-sphingosine (synthetic), ZIP, RO 31-8220 Mesylate, and others.

As used herein, a histone deacetylase (HDAC) inhibitor can refer to an agent that downregulates, decreases or suppresses the amount and/or activity of histone deacetylase to remove acetyl groups from lysine residues on histones. Examples of HDAC inhibitors include, but are not limited to, valproic acid (VPA, 2-Propylpentanoic acid), Apicidin, CI 994, FK 228, LMK 235, M 344, MC 1568, MC 1742, MI 192, NCH 51, NSC 3852, PCI 34051, Sodium 4-Phenylbutyrate, Pyroxamide, SAHA, SBHA, Scriptaid, Sodium butyrate, TC-H 106, TCS HDAC6 20b, Trichostatin A, Tubacin, UF O10, Mocetinostat, Pracinostat, and others.

As used herein, the term "an isolated or purified population of cells" or "isolated or purified cells" refer to a preparation of cells that have been separated from other cellular components or other cells with which the cells are associated. For example, an isolated cell may have been removed from its native environment or group of cells, or may result from propagation of a cell that has been removed from a group of cells. When cells are described as "isolated" or "purified," it should be understood as not absolutely isolated or purified, but relatively isolated or purified. For example, a preparation comprising isolated cells may comprise the cells in an amount of 0.5% or more, 10% or more, 20% or more, 30% or more, 40% or more, 50% or more, 60% or more, 70% or more, 80% or more, 90% or more, or 100% of the total cell number in the preparation. In some particular embodiments, a preparation comprising isolated cells may comprise the cells in an amount of 50% or more, 60% or more, 70% or more, 80% or more, 90% or more, or 100% of the total cell number in the preparation.

As used here, the term "subject" as used herein includes human and non-human animals such as companion animals (such as dogs, cats and the like), farm animals (such as cows, sheep, pigs, horses and the like), or laboratory animals (such as rats, mice, guinea pigs and the like).

As used herein, the term "treating" when relating to therapeutically treating refers to the application or administration of a composition including one or more active agents to a subject afflicted with a disorder, a symptom or conditions of the disorder, or a progression of the disorder, with the purpose to cure, heal, alleviate, relieve, alter, remedy, ameliorate, improve, or affect the disorder, the symptoms or conditions of the disorder, the disabilities induced by the disorder, or the progression of the disorder. On the other hand, the term "treating" can refer to an application or a process irrelevant to therapeutically treating a disease, such as applying one or more ingredients or agents to contact cells so as to change their fate e.g. reverting to other cell types.

As used herein, the term "therapeutically effective amount" used herein refers to the amount of an active ingredient to confer a therapeutic effect in a treated subject. The therapeutically effective amount may change depending on various reasons, such as administration route and frequency, body weight and species of the individual receiving said pharmaceutical, and purpose of administration. As used herein, the term "effective amount" when referring to an application or a process irrelevant to therapeutically treating a disease can refer to the amount of an ingredient or agent to be applied to achieve the intended purpose e.g. the amount of an ingredient or agent to be applied to contact cells e.g. fibroblasts for the purpose of reprogramming.

2. Use of Chemical Agents to Generate Induced OLGs

The present invention is based on an unexpected finding that skin cells e.g. fibroblasts can be reprogrammed into induced oligodendrocyte-lineage cells (OLGs) by incubation with a chemical inducer, and one or more auxiliary agents, without gene modification by transduction with transcriptional factors.

According to the present invention, skin cells can be cultured in a medium containing a chemical inducer including a Rho-associated protein kinase (ROCK) inhibitor and an auxiliary agent selected from the group consisting of a histone deacetylase (HDAC) inhibitor, a cyclin-dependent kinase (CDK) inhibitor, a protein kinase C (PKC) inhibitor, a cyclic adenosine monophosphate (cAMP) activator, and any combination thereof, in amount(s) effective in inducing reprogramming such that the skin cells are converted to OLGs. In some embodiments, the auxiliary agent includes the CDK inhibitor. In some embodiments, the auxiliary agent includes the HDAC inhibitor and the cAMP activator, optionally with the CDK inhibitor. The chemical inducer and the auxiliary agent(s) can be added to the culture medium simultaneously or sequentially For example, an auxiliary agent is added first to the culture medium for pre-treatment (pre-culture) and then a chemical inducer is added later for subsequent culture. In some embodiments, the HDAC inhibitor (e.g. VPA) is added to the culture medium before the ROCK inhibitor (e.g. Y27632). The period of time for pretreatment (pre-culture) is about one tenth (1/10), one fifth (1/5), one forth (1/4), one third (1/3) or more of the total culture period of time. In one example, the period of time for pretreatment (pre-culture) is about two third (2/3) of the total culture period of time.

Culture media suitable for culturing skin cells according to the present invention are available in this art, such as DMEM, MEM, DMEM/F12, knockout DMEM, or IMEM medium. The culture can be carried out at in a normal condition, for example, 37° C. under 1-10% $CO_2$. Specifically, the culture medium can be serum free.

In some embodiments, the culture medium for conversion (conversion medium) contains knockout DMEM, AlbuMAX I, N2 supplement, nonessential amino acids (NEAA).

In some embodiments, the culture is carried out for at least 1 day or more (e.g. 2 days, 3 days, 4 days, 5 days, 6 days, 7 days, 8 days, 9 days, 10 days or more), whereby a proportion of the skin cells are converted into induced OLGs. In one certain example, the culture is carried out for 3 days or more, including pretreatment with an auxiliary agent for about 2 days (two-third of the total culture period of time) and with a chemical inducer and optionally with auxiliary agent(s) for further 1 day (one-third of the total culture period of time).

In some embodiments, the culture medium can comprise one or more growth factors and/or culture supplements in favor of oligodendrocyte differentiation. Examples of growth factors include but are not limited to platelet-derived growth factor (PDGF), epidermal growth factor (EGF), fibroblast growth factor (FGF), and neurotrophin-3 (NT3). Examples of culture supplements include but are not limited to N2 and B27.

Table A illustrates some examples of the chemical inducer as used herein.

TABLE A

| Name/Source | Mechanism | Concentration | Structure |
| --- | --- | --- | --- |
| Y-27632 | ROCK inhibitor | 0.5-50 μM | Trans-4-[(1R)-1-Aminoethyl]-N-(4-pyridinyl)cyclohexane-carboxamide |
| | | | 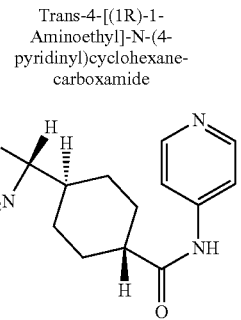 |
| SU9516 | CDK inhibitor | 0.5-50 μM | (Z)-3-((1H-imidazol-5-yl)methylene)-5-methoxyindolin-2-one |
| | | | 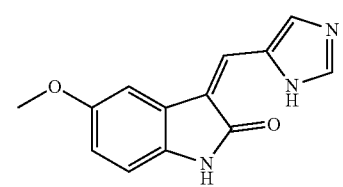 [SMILES: COc1ccc2c(c1)/C(=C/c1cnc[nH]1)C(=O)N2] |
| BIO | CDK inhibitor | 0.1-10 μM | 2H-Indol-2-one, 6-bromo-3-[(3E)-1,3-dihydro-3-(hydroxyimino)-2H-indol-2-ylidene]-1,3-dihydro-, (3Z)- |
| | | | 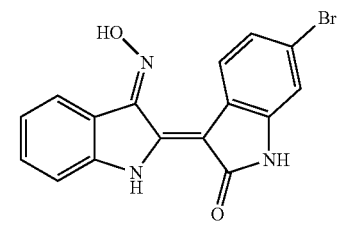 [SMILES: O=C1Nc2cc(Br)ccc2/C1=C1/Nc2ccccc2/C1=N\O] |

TABLE A-continued

| Name/Source | Mechanism | Concentration | Structure |
|---|---|---|---|
| AZD1080 | CDK inhibitor | 0.1-10 μM | 1H-Indole-5-carbonitrile, 2-hydroxy-3-[5-(4-morpholinylmethyl)-2-pyridinyl]- |
| Roscovitine | CDK inhibitor | 0.1-10 μM | (R)-2-(6-(benzylamino)-9-isopropyl-9H-purin-2-ylamino)butan-1-ol |
| Forskolin, FSK | CAMP activator | 5-500 μM | (3R,4aR,5S,6S,6aS,10S,10aR,10bS)-6,10,10b-Trihydroxy-3,4a,7,7,10a-pentamethyl-1-oxo-3-vinyldodecahydro-1H-benzo[f]chromen-5-yl acetate |
| Valproic acid | Histone deacetylase inhibitor | 0.2-20 mM | 2-Propylpentanoic acid |

TABLE A-continued
| Name/Source | Mechanism | Concentration | Structure |
| --- | --- | --- | --- |
| Mocetinostat (MGCD0103) | HDAC inhibitor | 0.1-10 μM | N-(2-aminophenyl)-4-((4-(pyridin-3-yl)pyrimidin-2-ylamino)methyl)benzamide 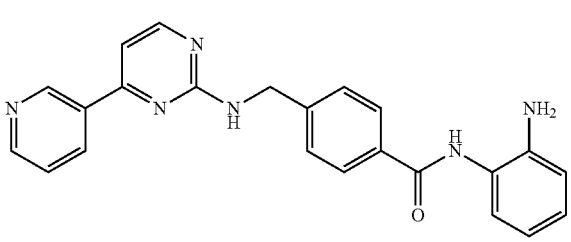 [SMILES: Nc1ccccc1NC(=O)c1ccc(CNc2nccc(-c3cccnc3)n2)cc1] |
| Pracinostat (SB939) | HDAC inhibitor | 0.1-10 μM | (E)-3-(2-butyl-1-(2-(diethylamino)ethyl)-1H-benzo[d]imidazol-5-yl)-N-hydroxyacrylamide 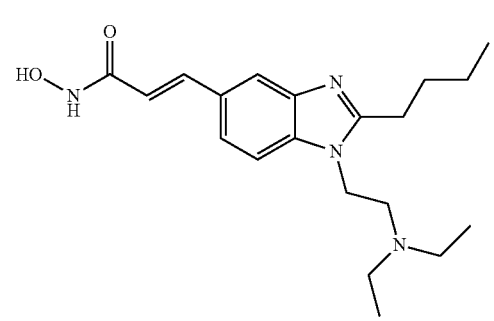 [SMILES: CCCCc1nc2cc(/C=C/C(=O)NO)ccc2n1CCN(CC)CC] |
| Go 6983 | PKC inhibitor | 0.5-50 μM | 3-{1-[3-(Dimethylamino)propyl]-5-methoxy-1H-indol-3-yl}-4-(1H-indol-3-yl)-1H-pyrrole-2,5-dione 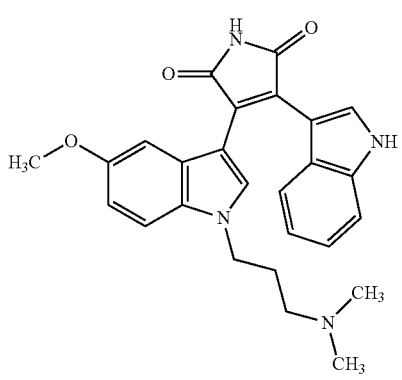 [SMILES: COc1ccc2c(c1)c(C1=C(c3c[nH]c4ccccc34)C(=O)NC1=O)cn2CCCN(C)C] |

TABLE A-continued

| Name/Source | Mechanism | Concentration | Structure |
|---|---|---|---|
| Bisindolyl-maleimide IX (Ro 31-8220 Mesylate) | pan-PKC inhibitor | 0.1-10 µM | Carbamimidothioic acid, 3-[3-[2,5-dihydro-4-(1-methyl-1H-indol-3-yl)-2,5-dioxo-1H-pyrrol-3-yl]-1H-indol-1-yl]propyl ester, methanesulfonate (1:1) |

According to the present invention, about 5%, 10%, 15%, 20%, 25%, 30%, 35%, 40%, 45%, 50%, 55%, 60%, 65%, 70%, 75%, 80% or more of the skin cells in the culture are reprogrammed into induced OLGs. In some certain embodiments, about 20% or more, such as 30% to 90% (e.g. 40% to 80%, 50% to 75%) of the skin cells in the culture are reprogrammed into induced OLGs.

In particular embodiments, the skin cells are treated with a HDAC inhibitor (e.g. VPA) first and then with a ROCK inhibitor (e.g. Y27632) and a cAMP activator (FSK), and optionally further with a CDK inhibitor (SU9516).

In particular embodiments, the skin cells are treated with a ROCK inhibitor (e.g. Y27632) and a CDK inhibitor (SU9516).

3. Skin Cells for Use in Reprogramming

Skin cells e.g. fibroblasts can be used herein to generate induced OLGs in the present invention. Fibroblasts as used herein for reprogramming can be obtained from neonatal or adult donors.

Skin biopsies can be obtained from proper autologous or allogenic donors by skin puncture or circumcision and skin fibroblasts can be grown from the skin biopsies. In general, skin biopsies of about 4-mm can generate 15-20 million fibroblasts. In some embodiments, commercial fibroblasts are available. Preferably, the fibroblasts for conversion into induced OLGs as used herein are of mammalian origin, most preferably of human origin, 4. Induced OLGs According to the present invention, the induced OLGs as generated are of OLG-like features. Specifically, the induced OLGs have OLG-like morphology (cell body is domed and solid, bipolar or multipolar branching). More specifically, the induced OLGs as generated can express typical OLG markers.

In some embodiments, the OLG marker is selected from the group consisting of platelet-derived growth factor receptor (PDGFR), myelin basic protein (MBP), oligodendrocyte transcription factor (OLIG2), SOX10, proteolipid protein (PLP) 1, Glial fibrillary acidic protein (GFAP), Ki67, A2B5, O4 and any combination thereof.

After culture in some embodiment, to further enrich induced OLGs, the cells can be sorted with one or more OLG markers. Cell sorting can be achieved by various techniques as known in the art. Examples of cell sorting techniques include fluorescence-activated cell sorting (FACS), immunoaffinity column separation or immunomagnetic separation (MACS) or any technique which is capable of obtaining enrichment of one certain cell type on the basis of physical characteristics (density) or structural characteristics (in particular specific antigens).

5. Applications Using Induced OLGs

Based on our findings, it is possible to generate autologous or allogenic induced OLGs from accessible skin biopsy, which can be easily obtained in the clinic. This process does not require surgery or any other painful process.

The induced OLGs are effective in promoting myelination of neurons and therefore are useful in therapy, in particular for treating a demyelinating disease or a disease or disorder is associated with oligodendrocyte dysfunction.

Examples of such disease or disorder include but not limited to multiple sclerosis (MS), acute hemorrhagic inflammatory disease (AHL), cerebral palsy, acute-disseminated encephalomyelitis (ADEM), central pontine myelinolysis, progressive multifocal leukoencephalopathy, congenital leukodystrophies, Parkinson's disease, Huntington's disease, schizophrenia, and demyelinating diseases caused by radiation therapy.

Therapeutic uses of induced OLGs include transplanting the induced OLGs into a subject in need. The cells may be injected or transplanted to central neuron system (CNS) e.g. corpus callosum or cerebellum, in amounts effective in promoting myelination of neurons.

In general, the present invention provides a new technology to generate induced OLGs including the features and advantages as follows:

(i) The first method to generate induced OLGs from human differentiated somatic cells.
(ii) The first chemical cocktail able to reprogram/trans-differentiate somatic cells into OLGs. No prior technology can generate OLGs from any other somatic cell types by chemicals.
(iii) Induced OLGs are generated with a few chemicals (with or without growth factors) within 3 days.
(iv) The conversion rate of producing induced OLGs from skin fibroblasts are high. The average efficiency is over 30%.
(v) Induced OLGs are expandable, similar to nature cells.
(vi) The components of cocktails for generate induced OLGs are all well-defined and do not contain animal serum, which is suitable for clinical applications and has high reproducibility.
(vii) The induced OLGs express specific markers of glial cells and oligodendrocytes.
(viii) It is a chemical reprogramming process, without retrovirus/lentivirus/plasmid infection process, which avoids insertional mutagenesis or other biosafety concerns.

The present invention can provide a variety of applications as follows:
(i) A commercial kit for generating induced oligodendrocyte-lineage cells. Since this is the first and only method to generate OLGs from somatic cells, it is possible to make it as a kit for generating oligodendrocyte-lineage cells for basic research and cell therapy.
(ii) Generation of induced oligodendrocyte-lineage cells for disease treatments. Based on our findings, it will be possible to generate autologous or allogenic OLGs from accessible somatic cells like skin biopsy, which can be easily obtained in the clinic. This process does not require surgery or any other painful process. Then the patients can get the autologous induced oligodendrocyte-lineage cells and do not need to take immunosuppressive drugs. Alternatively, it will be easier to find healthy donors willing to donate skin cells for induced OLG production while compared to the OLGs obtain form CNS by surgery. Given glial cells' ability to remyelination and neural supportive, the diseases can be treated by induced OLGs may include demyelinating diseases and neurodegenerative diseases [Multiple Sclerosis (MS) and acute hemorrhagic encephalitis (AHL), cerebral palsy, Parkinson's disease, schizophrenia and demyelinating diseases caused by radiation therapy]. We may also utilize the pharmaceutical formula of the present invention to directly convert somatic cells into functional OLGs in vivo to promote the repair of nerve tissue.
(iii) Oligodendrocyte-lineage cells in tissue engineering and regenerative medicine. Induced OLGs can support the growth and differentiation of nerve cells and can help repair nerve damage in neurological disease treatment. The conversion method can be used in conjunction with appropriate biomedical materials to support neural growth such as construction of neurotube in tissue engineering and regeneration medicine.
(iv) Personalized therapeutic platform. We can use induced OLGs for drug screening to find suitable drug targets for different patients. Patients can use their own somatic cells or fibroblasts to generate inducible OLGs to establish the best-personalized treatment for glial cell line-related diseases.

Specifically, the present invention provides a culture comprising skin cells and a culture medium which comprises a chemical inducer and one or more auxiliary agents as described herein. In particular, the culture further comprises induced OLGs derived from the skin cells.

According to the present invention, induced OLGs or a culture thereof as described herein may be used an active ingredient for treating a disease in a subject in need. In some embodiments, a therapeutically effective amount of the active ingredient may be formulated with a pharmaceutically acceptable carrier into a pharmaceutical composition in an appropriate form for the purpose of delivery and absorption. Depending on the mode of administration, the pharmaceutical composition of the present invention preferably comprises about 0.1% by weight to about 100% by weight of the active ingredient, wherein the percentage by weight is calculated based on the weight of the whole composition. The composition can be used directly as an implant or further modified to a suitable form for transplantation.

As used herein, "pharmaceutically acceptable" means that the carrier is compatible with the active ingredient in the composition, and preferably can stabilize said active ingredient and is safe to the individual receiving the treatment. Examples of a pharmaceutically acceptable carrier include conventional buffers (phosphoric acid, citric acid, other organic acids, etc.), physiological saline, sterilized water, anti-oxidants (ascorbic acid, etc.), isotonic agents, and preservatives.

In some embodiments, the composition according to the present invention is formulated into a dosage form suitable for injection, where the cells are suspended in a pharmaceutically acceptable carrier e.g. sterilized water or physiological saline or frozen for storage before use. In some embodiments, the composition can further comprise a biodegradable polymer which is useful in stabilizing, supporting and fixing the cell cluster after being locally injected into the defective site. The composition according to the present invention can be formulated as a unit dosage form or incorporated into a multiple dose container. The dosage forms may be a suspension, solution, or emulsion in oil or aqueous medium, or powders, granules, tablets, or capsules. The composition of the invention may be delivered through a physiologically acceptable route, typically via injection.

The present invention is further illustrated by the following examples, which are provided for the purpose of demonstration rather than limitation. Those of skill in the art should, in light of the present disclosure, appreciate that many changes can be made in the specific embodiments which are disclosed and still obtain a like or similar result without departing from the spirit and scope of the invention.

EXAMPLES

Many demyelinating diseases are associated with oligodendrocyte dysfunction, such as multiple sclerosis (MS), and acute hemorrhagic inflammatory disease (AHL). Some demyelinating diseases are caused by radiation therapy. In addition, some neurodegenerative diseases such as cerebral palsy, Parkinson's disease, Huntington's disease and schizophrenia are also oligodendroglial diseases. Therefore, glial cells have great promise for the treatment of neurodegenerative diseases and demyelinating diseases. Currently, approximately 115 clinical trials are investigating the efficacy of glial cell-associated therapy (www.clinicaltrials.gov). To date, it is known that oligodendrocyte-lineage cells (OLG) can be derived from embryonic stem cells (ESCs) or induced pluripotent stem cells (iPSCs). However, the differentiation protocol required more than 45 days which is labor consuming and high cost. In addition, ESCs or iPSCs have the risk of teratoma. Only mouse or rat OLGs, but not human, can be derived from fibroblasts with transcription factor induction. Until now, there is no scheme for exporting any OLGs using a chemical cocktail. Our project provides the first method to generate human induced OLGs from dermal fibroblasts using chemicals. The protocols are highly efficient and avoid insertion of viral genes. Most importantly, this is by far the fastest reprogramming protocol just only takes 3 days. This finding may be beneficial to stem cell biology, cell therapy, and regenerative medicine.

1. Material and Methods 1.1 Generation of Induced OLGs

Cells ($1 \times 10^4$) were plated on each well of a 24-well plate. Culture in HG-DMEM (Life technologies) supplement with 10% fetal bovine serum (FBS) (Hyclone) for 2 days, replace the medium with Knockout medium supplement with 1% N2 supplement, 1% Albumax, 1% NEAA (treatment medium, all form Life technologies) or DMEM/F12 with 1% N2, 1% B27, 20 ng/mL PDGF-AA, EGF, bFGF and 10 ng/mL NT3 and added the different treatment chemical compound cocktails, The final condition are 3 mM Valproic acid for 2 days, 10 μM Y27632, 10 μM SU9516, 10 μM Forskolin (FSK) (Tocris) for 1 days; or 10 μM Mocetinostat or Pracinostat for 2 days, 10 μM Y27632, 10 μM SU9516, 10 μM Forskolin (FSK) (Tocris) for 1 days.

1.2 Quantitative Real-Time Polymerase Chain Reaction (qRT-PCR).

Total RNA was isolated by using the RNeasy Micro (Qiagen, Hilden, Germany) or TRIzol® LS Reagent (Thermo Fisher Scientific) according to the manufacturer's instructions. RNA was treated with DNase I to remove contaminated DNA (Promega, Madison, WI, USA), and was reverse transcribed using Superscript III. The resulting cDNAs (80 ng/sample) were used as templates for quantitative real-time reverse transcription PCR (qRT-PCR), which were performed using the SYBR GREEN 2× master mix (KAPA Biosystems, Wilmington, MA, USA). The relative cDNA amounts were measured and quantified using the ABI 7900 Real-Time PCR System (Applied Biosystems, Carlsbad, CA, USA). The relative amounts of target genes were normalized against the RNA levels of glyceraldehyde 3-phosphate dehydrogenase (GADPH).

1.3 Immunofluorescence Assay.

The induced OLGs were fixed with 4% formaldehyde for 15 at room temperature. After washing with 1×PBS, cells were permeabilized with 0.03% Triton X-100 for 5 min. The cells were washed twice with 1×PBS, and then were incubated with primary antibodies [against Olig2 antibody (1:100; Merck millipore), Nkx2.2 (1:100; Stanta Cruz), O4 antibody (1:100; Merck millipore), MBP antibody (1:100; Proteintech), PDGFRα antibody (1:100; R&D systems)] and 4',6-diamidino-2-phenylindole (DAPI) (1:1500; Life technologies) in blocking buffer (0.02% BSA in PBS) for overnight at 4° C. Cells were washed twice in 1×PBS, followed by an incubation in CF555 goat anti-rabbit secondary antibody (1:200; Life technologies), CF488 goat anti-rabbit secondary antibody (1:200; Biotium), CF555 goat anti-mouse secondary antibody (1:200; Life technologies), CF488 goat anti-mouse secondary antibody (1:200; Biotium), CF555 goat anti-rat secondary antibody (1:200; Life technologies) in blocking buffer for 1 hr in the dark at room temperature. Cells were washed twice in 1×PBS, and the cells will be keeping in 1×PBS. Fluorescence was analyzed by using a fluorescence microscope. The fluorescence intensity of each image was analyzed by an image analysis software (Image-Pro plus 4.5 software, MD, USA). Each immunofluorescence image was quantified more than 300 cells per field.

1.4 Flow Cytometry.

Cells were incubated with first and secondary antibodies sequentially. The cells will then were analyzed by FACSCanto (Becton Dickinson, Franklin Lakes, NJ, USA). The data was further quantified by FACSDiva software (BD Biosciences).

1.5 Myelination Coculture Assay.

Purified dorsal root ganglion neuron (DRGN) cultures were isolated from mice. The cells were maintained in maturation medium (DMEM-F12 supplemented with N1, 0.01% bovine serum albumin, and B27 supplement (Invitrogen), 10 ng/mL basic fibroblast factor (bFGF), and 2 nmol/L triiodothyronine (T3), 10 ng/mL platelet-derived growth factor (PDGF)-AA, 12.5 ng/mL nerve growth factors (NGF) for 3 weeks. The cells formed a network of neurons. Oligodendrocyte lineage cells ($0.7 \times 10^5$ cells/cm$^2$) were suspended in the defined medium into the DRGN culture. The defined medium consisted of DMEM-F12 supplemented with N1 (Sigma-Aldrich), 0.01% bovine serum albumin, 1% penicillin-streptomycin, and B27 supplement (Invitrogen), 10 ng/mL platelet-derived growth factor (PDGF)-AA, 10 ng/mL basic fibroblast factor (bFGF), and 2 nmol/L triiodothyronine (T3) (Sigma-Aldrich) (referred to as DM+GF). The degree of cell differentiation and myelination was analyzed after 2 weeks of co-culture.

2. Results 2.1 Optimization of Cocktail Composition to Five Chemicals

Figure 1B:
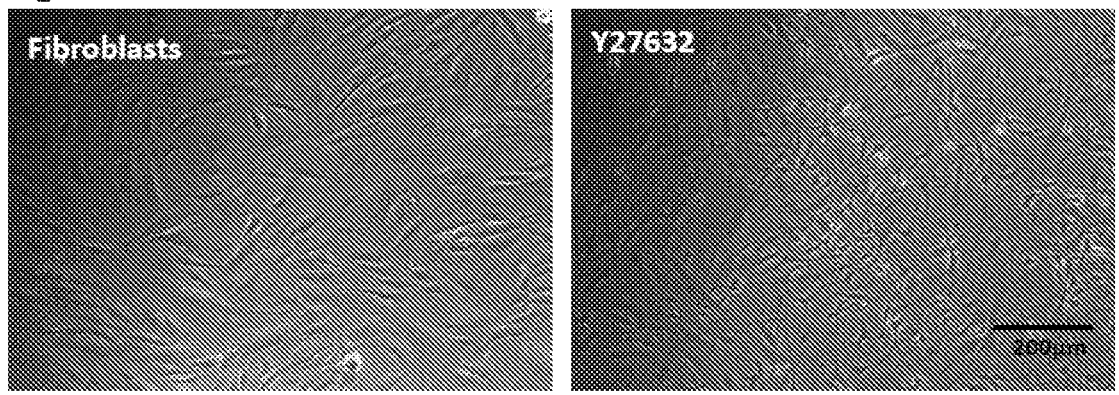
Figure 2A:
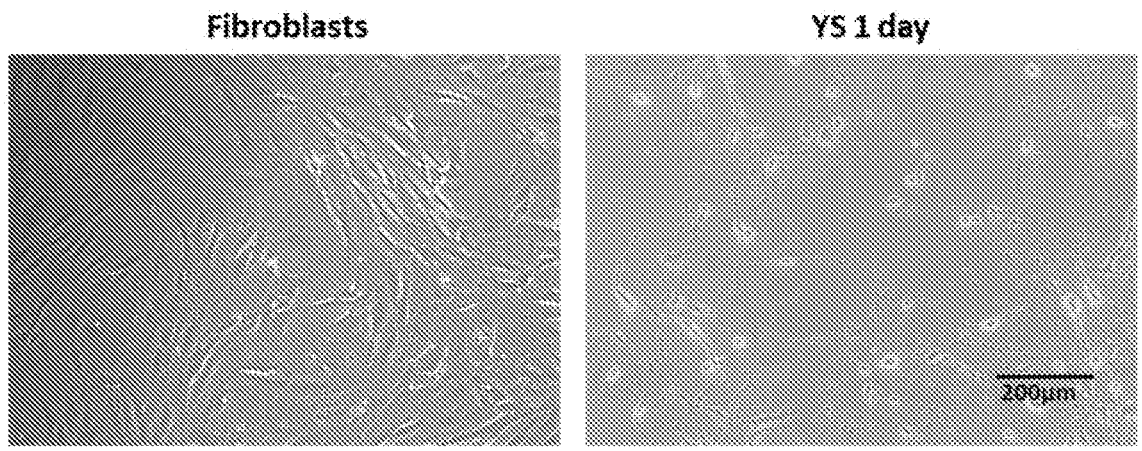
FIGS. 2A and 2B show that Y27632 and SU9516 reprogrammed the fibroblasts into induced OLGs.
Figure 2B:
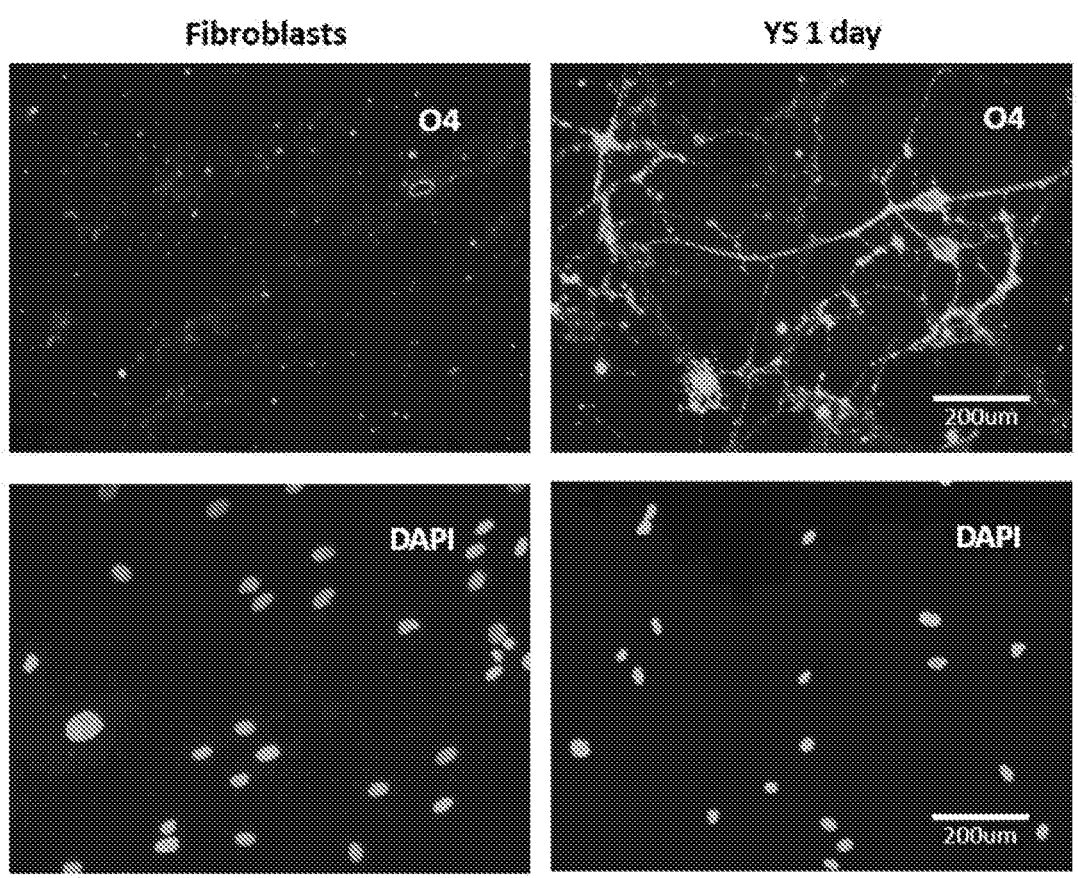
Figure 3:
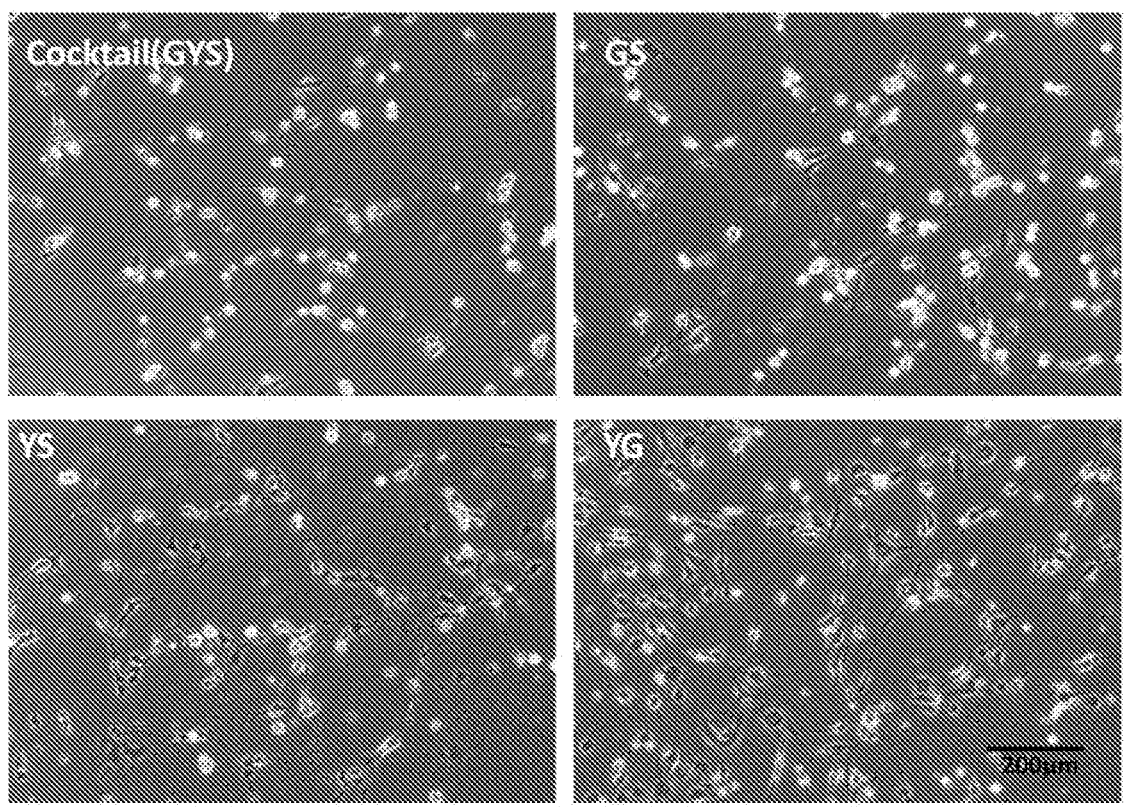
FIG. 3 shows that Go6983, Y27632 and SU9516 enhanced the reprogramming of induced OLGs. With the treatment of different combinations composed of Y27632 (Y), Go6983 (G) and SU9516 (S), the results suggested each of these factors promote the OLG-like morphology, dendrite growth, and domed-shape formation. Y: Y27632, S: SU9516, G: Go6983.
Figure 4A:
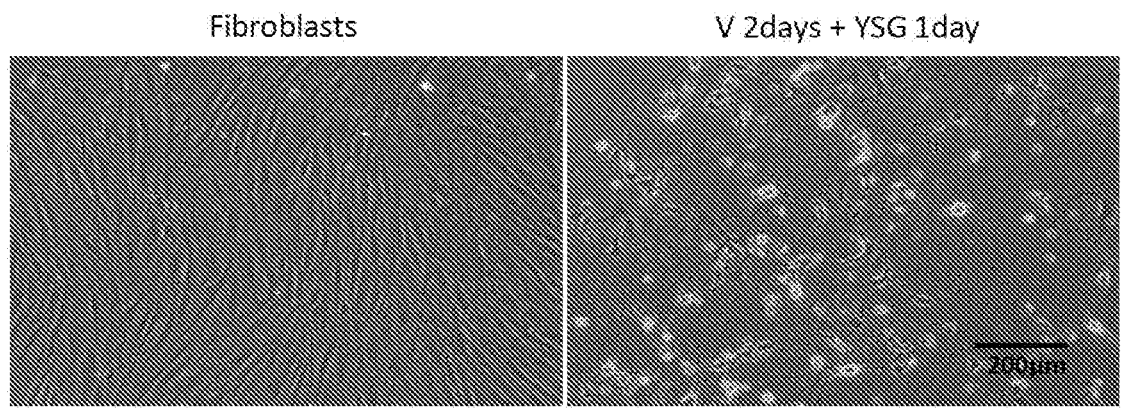
FIG. 4A-4B show efficiently enhancing the reprogramming efficiency by pre-treatment with VPA.
Figure 4B:
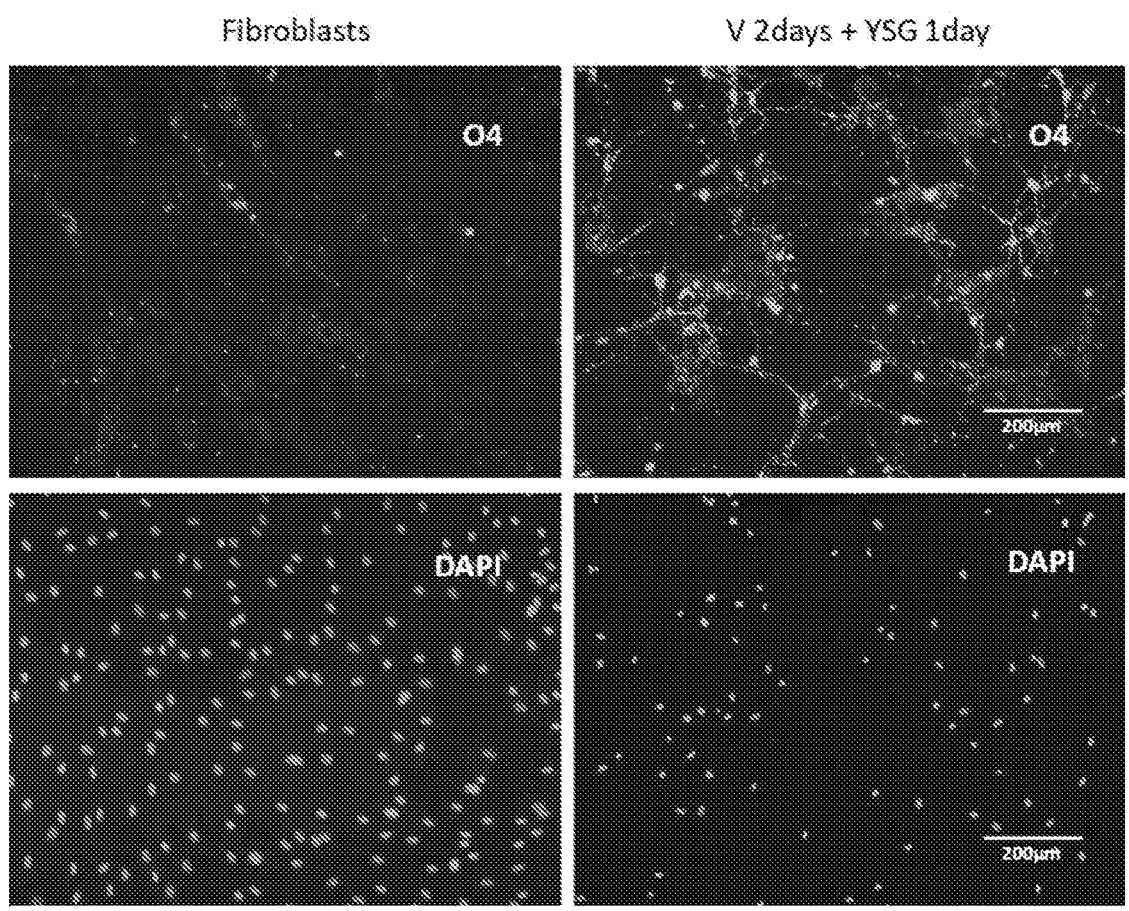
Figure 5:
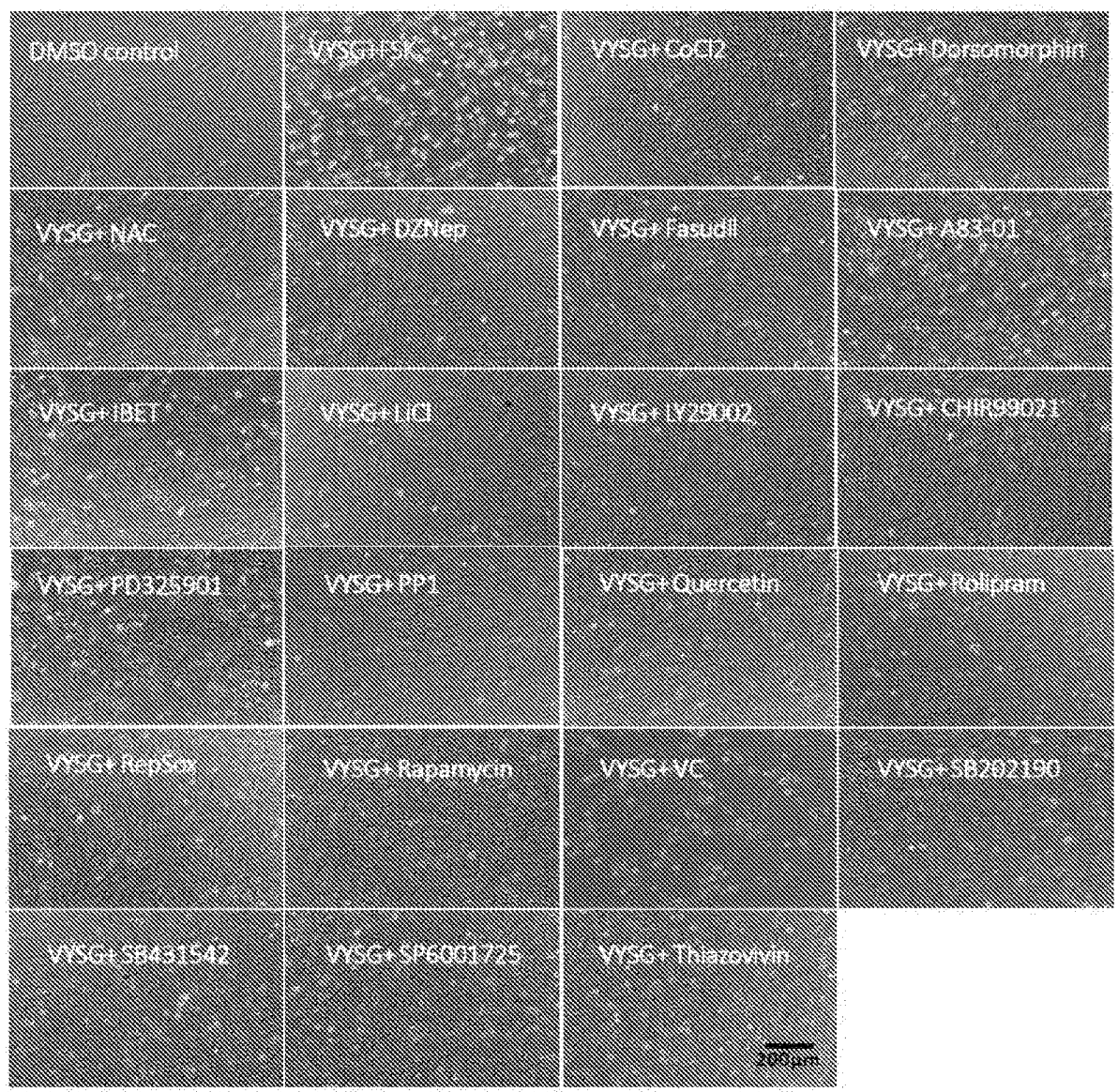
FIG. 5 shows that forskolin (FSK) promote the morphological change of induced OLGs. 22 chemicals were tested and to screen for drugs promoting YSG reprogramming after pre-treating with VPA. The data concluded that forskolin (FSK) could maintain the dome-shape cells and induced the cells with more dendrite-like structure. V: VPA, Y: Y27632, S: SU9516, G: Go6983.
Figure 6A:
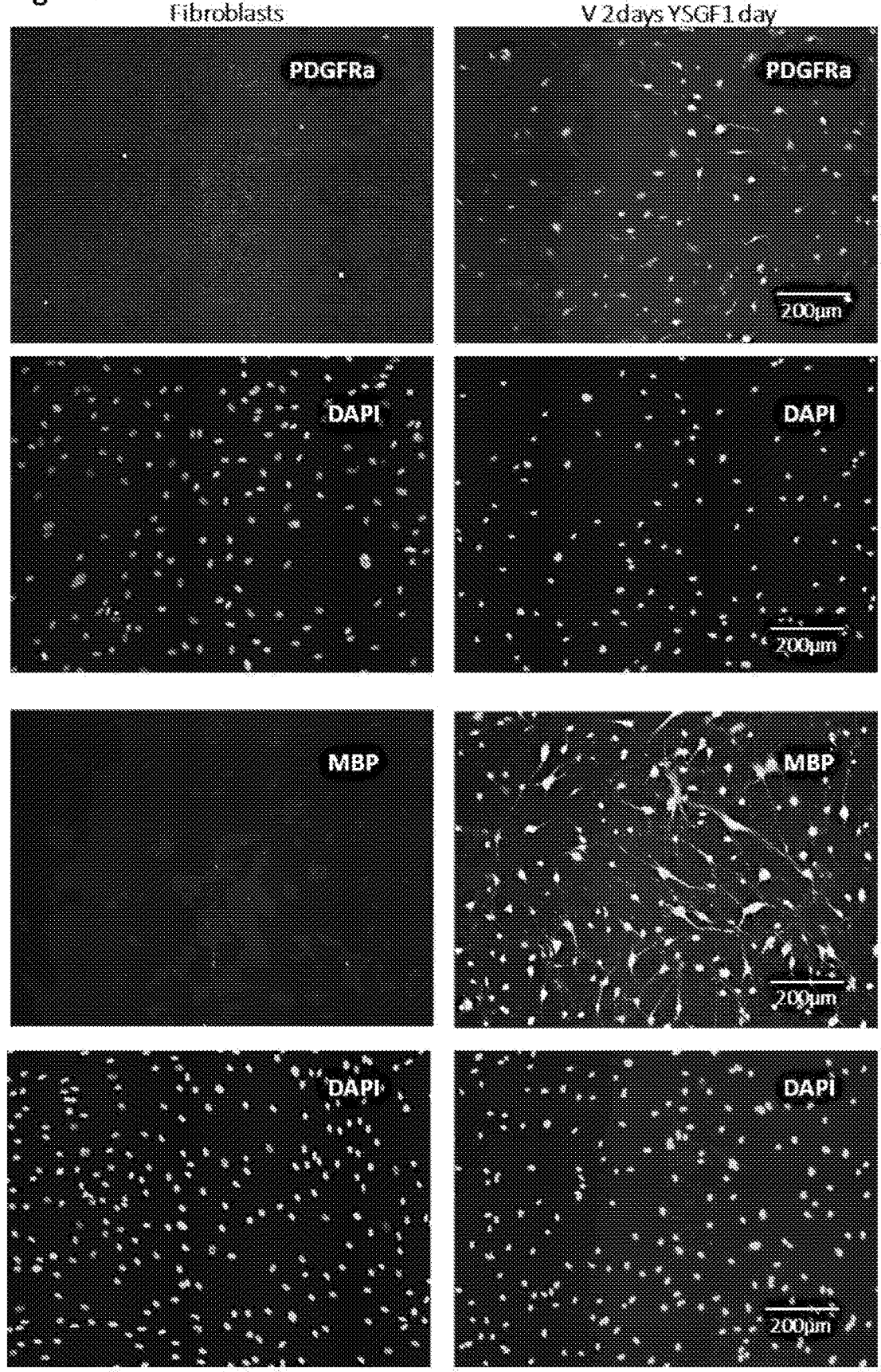
FIG. 6A shows that expression of multiple oligodendrocyte markers on induced OLGs treated by the five chemicals. The cells inducing by chemical cocktail (VYSGF) expressed PDGFRα (oligodendrocyte marker), MBP (Myelination protein), Olig2 and O4 (oligodendrocyte specific marker). Y: Y27632, S: SU9516, G: Go6983, F: Forskolin, V: Valproic acid.

To optimize the induction protocol of induced OLGs from skin fibroblasts, we first measured Y27632 and SU9516. The results revealed that SU9516 was associated with the domed-shape formation (FIG. 1A) and Y27632 lead to the dendritic-like morphological change (FIG. 1). The combination of Y27632 and SU9516 convert most of the fibroblasts into OLG like cells efficiently (FIG. 2A). The results showed that the morphology of induced cells changes rapidly within two days with significant expression of O4 (FIG. 2B). Furthermore, we incorporated the PKC inhibitor, Go6983, which has been reported to improve oligodendrogenesis[42]. The Go6983 promoted the dendrite-like formation with Y27632, and SU9516 remained the function of domed shaping (FIG. 3). Following the previous studies, we inhibited histone deacetylase and succeeded to enhance the reprogramming efficiency by pretreating valproic acid (VPA) for 2 days (FIG. 4A, 4B). Next, we screen for supporting factors from drug screening based on the cocktail. Among the 22 drugs, we found that the forskolin (FSK) significantly promoted the conversion (FIG. 5). Overall, the protocol was optimized to treat the cells with VPA, Y27632, Go6983, FSK, and SU9516 to direct the reprogramming (FIG. 6A, 6B). The optimized cocktail can transdifferentiate the skin fibroblasts into OLG like cells with corresponding cell morphology and marker expression. In our case, the five chemicals could effectively convert the cells within three days (FIG. 6A, 6B).

2.2 Expression of Multiple Oligodendrocyte Specific Markers on Induced OLGs Generated by Five Chemicals According to the preliminary data, we designed the cocktail with five chemicals to induce OLGs from fibroblasts. Herein, we check various oligodendrocyte specific markers on induced cells by immunofluorescence and QRT-qPCR (FIGS. 6A and 6B). The marker staining results indicated the expression levels of PDGFR [oligodendrocyte progenitor cell (OPC) marker], MBP (mature myelination oligodendrocyte marker) and Olig2 (transcription factor constitutively expressing in OPCs) were upregulated in induced OLGs (FIG. 6A). Also, we checked the expression level of SOX10 (transcription factor related to OPC differentiation), PLP1 (myelin protein expressed on mature oligodendrocyte) by RT-qPCR (FIG. 6B). The results indicated that SOX10, PLP1 were highly expressed. To sum up, the data showed the consistency of molecular signatures with the morphological change.

Figure 7:
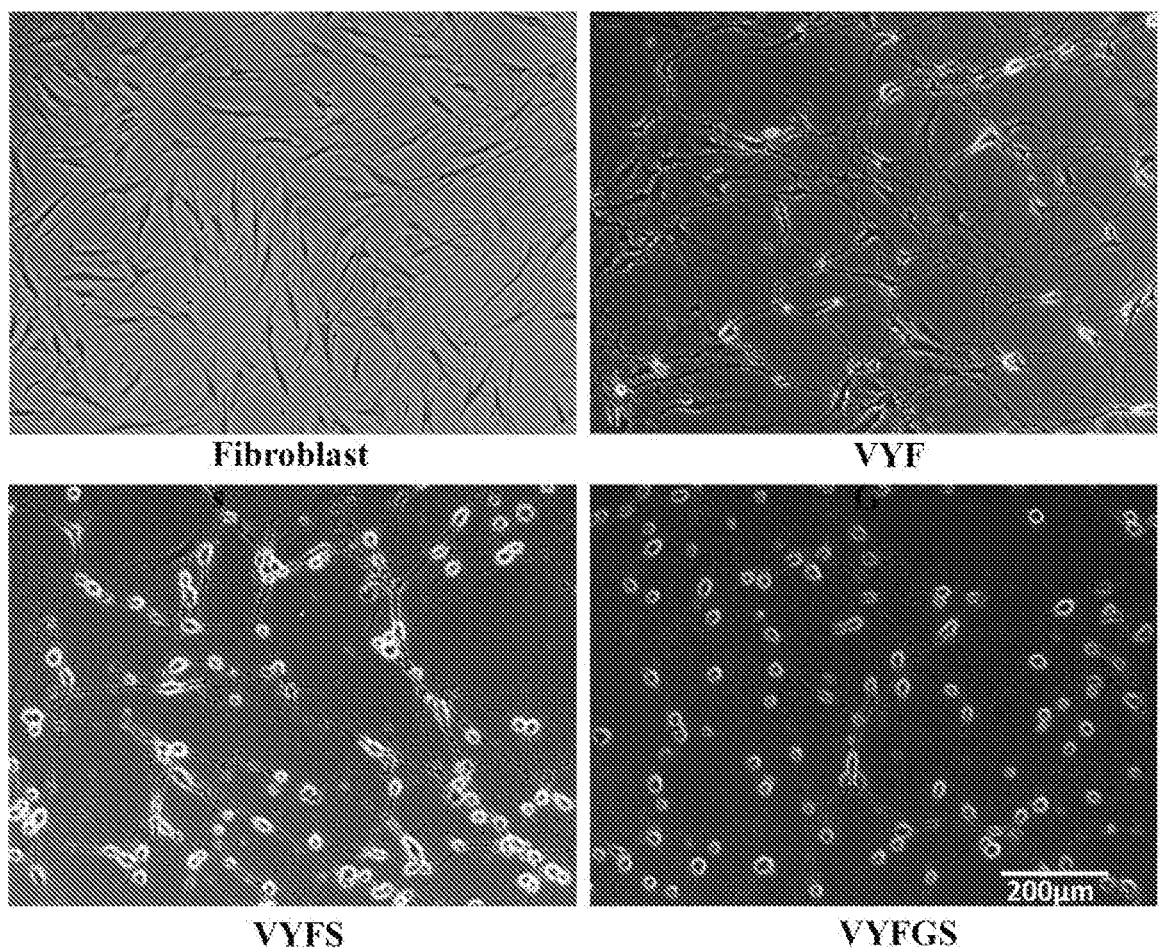
FIG. 7 shows that Go6983 was dispensable for the conversion process. Cells were treated with different combinations chemicals including VPA, Y27632, FSK, Go6983 or SU9516. The result indicated VPA, Y27632, FSK, and SU9516 induce the OLG like morphology, Go6983 is dispensable for the conversion process.
Figure 8:
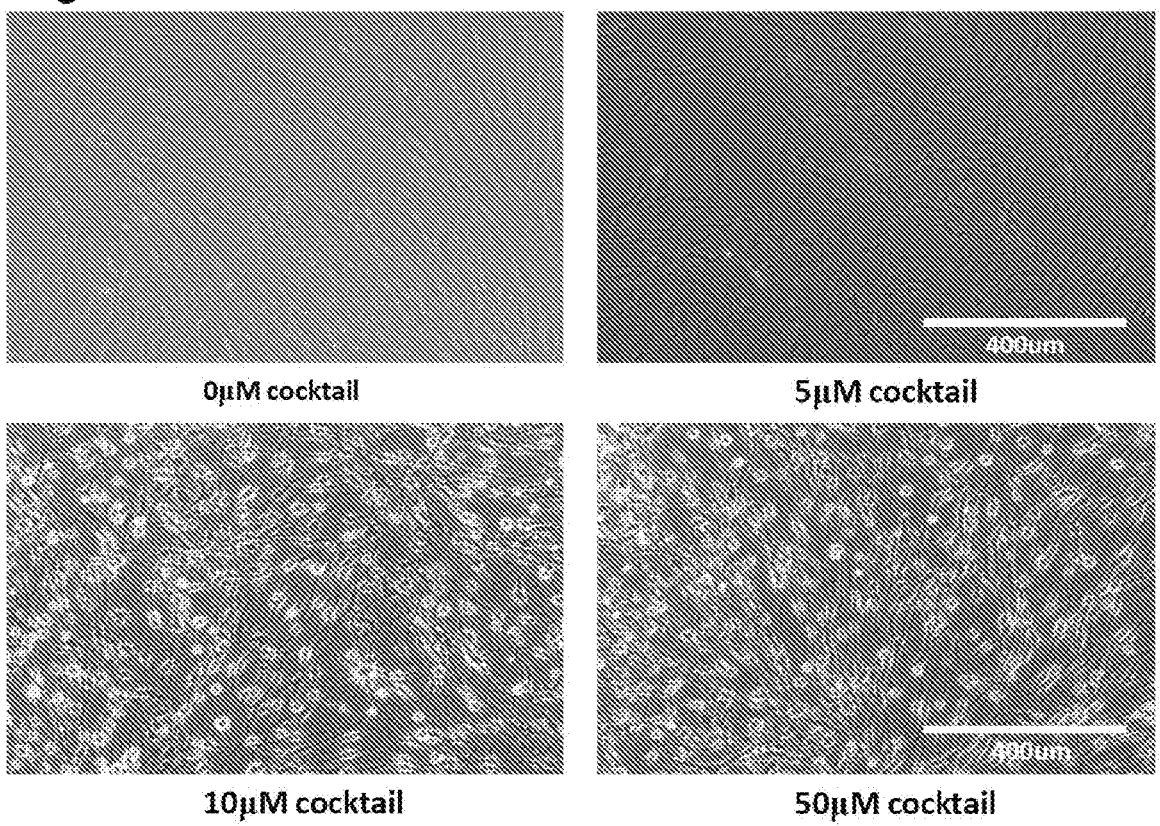
FIG. 8 shows that low dose of the 4C chemical cocktail (10 µM of Y27632, FSK, and SU9516, 3 mM of VPA) was sufficient for the conversion process. Cells are treated with different concentrations of Y27632, FSK, and SU9516 in the 4C chemical cocktail. The result indicate 10 µM of these chemicals could induce the OLGs.
Figure 9A:
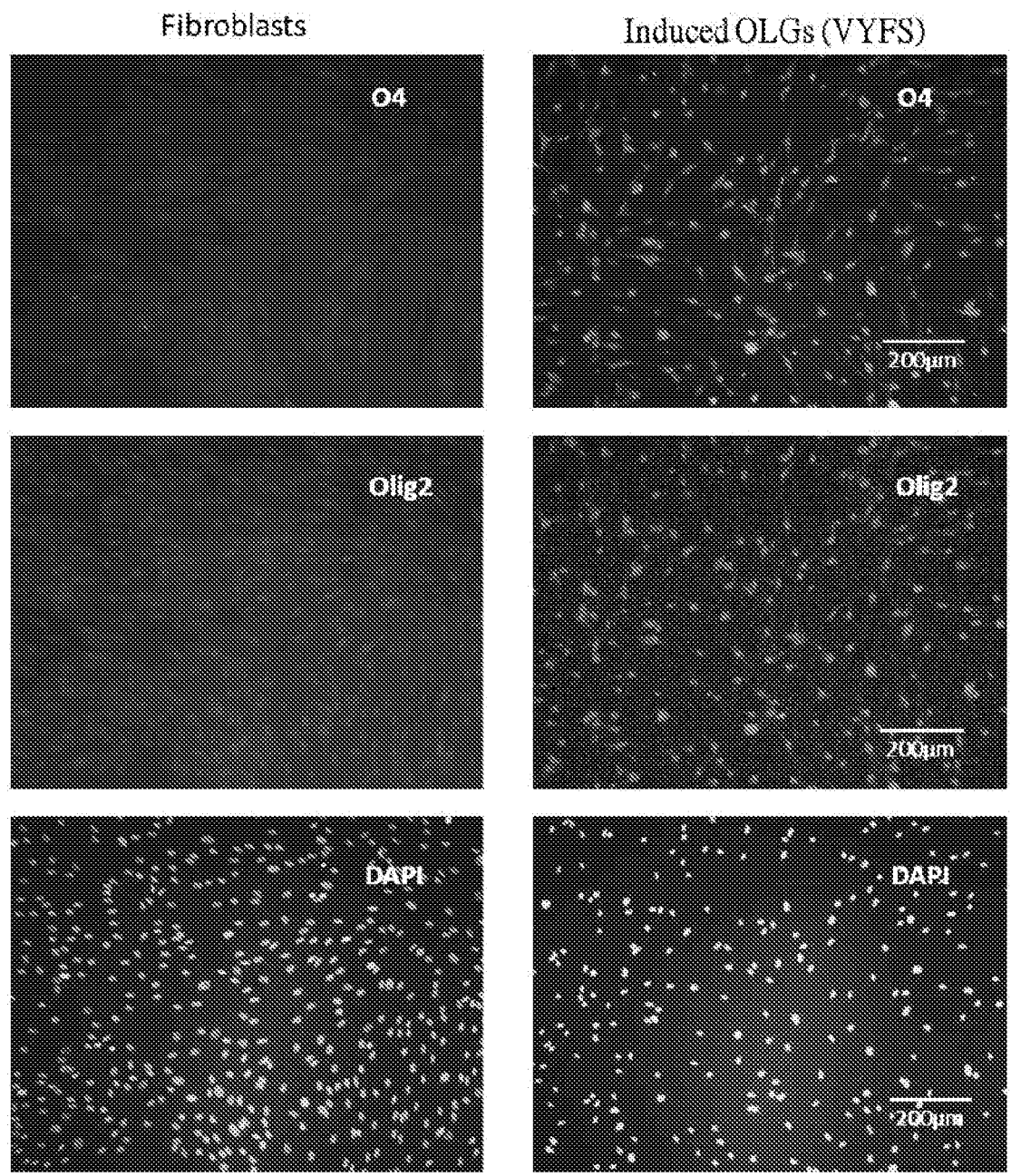
FIG. 9A shows that marker expressions of induced OLGs treated with four chemicals. The cells were induced by small molecules (VYSF) expressed OLG marker Olig2, O4, and PDGFRa. Y: Y27632, S: SU9516, F: Forskolin, V: Valproic acid.
Figure 9C:
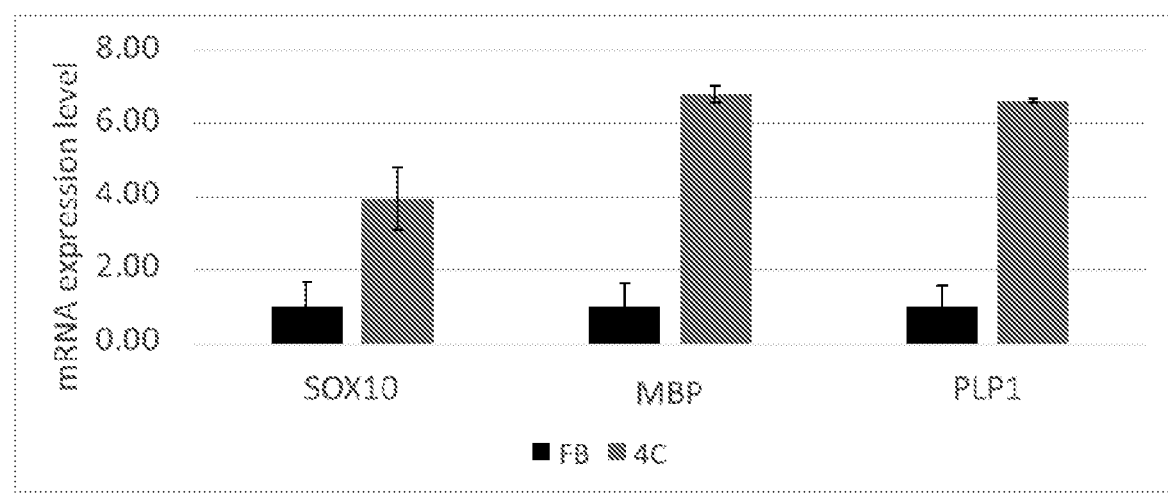
FIG. 9C shows that qPCR showed the increase of different oligodendrocyte specific genes Sox10, MBP, and PLP1. mRNA expression indicated the transcription factor SOX10, myelination protein MBP and PLP1 are upregulated in iOLGs (4C, VYSF) while compared to the fibroblasts.

2.3 Four Chemicals at Low Dose are Sufficient for the Conversion of Induced OLGs Furthermore, we found Go6983 is dispensable for the conversion process (FIG. 7). Moreover, low dose of the cocktail of Y27632, SU9516 and FSK (10 µM) was sufficient to get the similar results as high dose (50 µM) (FIG. 8). The results suggested that 10 µM was sufficient to trigger the reprogramming with better conversion efficacy. Specific markers of oligodendrocytes oligo2, O4, PDGFRa, GlaC, GRP17, MBP, O1 (FIGS. 9A and 9B) and were expressed abundantly by immunofluorescence assay. By qRT-PCR, Sox10, MBP, and PLP1 were significant upregulated more than 3 fold (FIG. 9C).

2.4 Induced OLGs can Myelinate Neurons Demonstrated by the Coculture Experiments.

Figure 10:
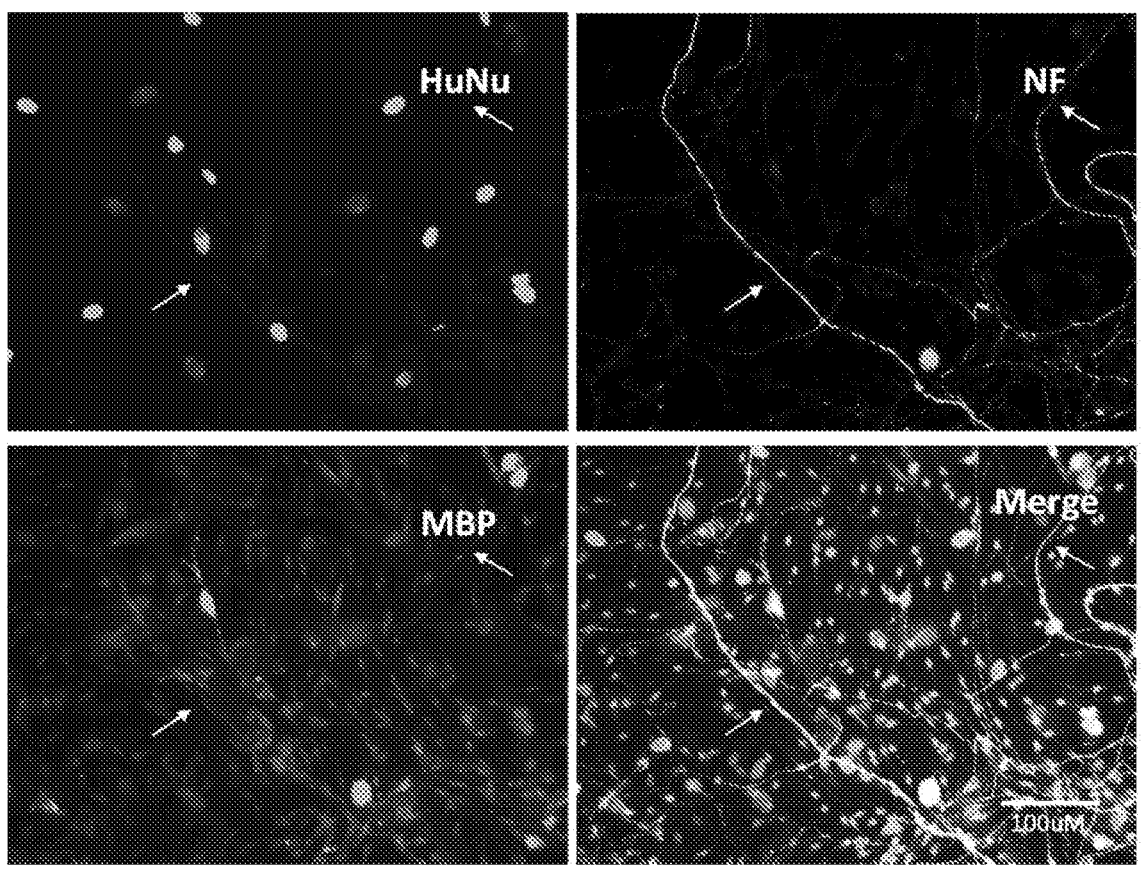
FIG. 10 shows that the induced OLG myelinated the neurons. Co-cultured induced OLG with mouse DRG showed that the oligodendrocyte specific marker MBP was co-localized with neural marker NF, revealing the induced OLG had myelination ability.

To elaborate the in vitro myelination ability, we performed the co-culture assay on induced OLGs (produced from skin cells via treatment with four compounds, 4C (VYSF)) with mouse neurons (dorsal-root ganglion cells, mDRGs). For the analysis, we distinguished the induced cells from mDRGs with the staining of the human nucleus (HuNu). The results demonstrated the colocalization of neurofilament (NF) and Myelin Basic Protein (MBP) on mDRGs and the induced OLGs (FIG. 10). It suggested that the neurons can be myelinated by the induced OLGs.

Figure 11:
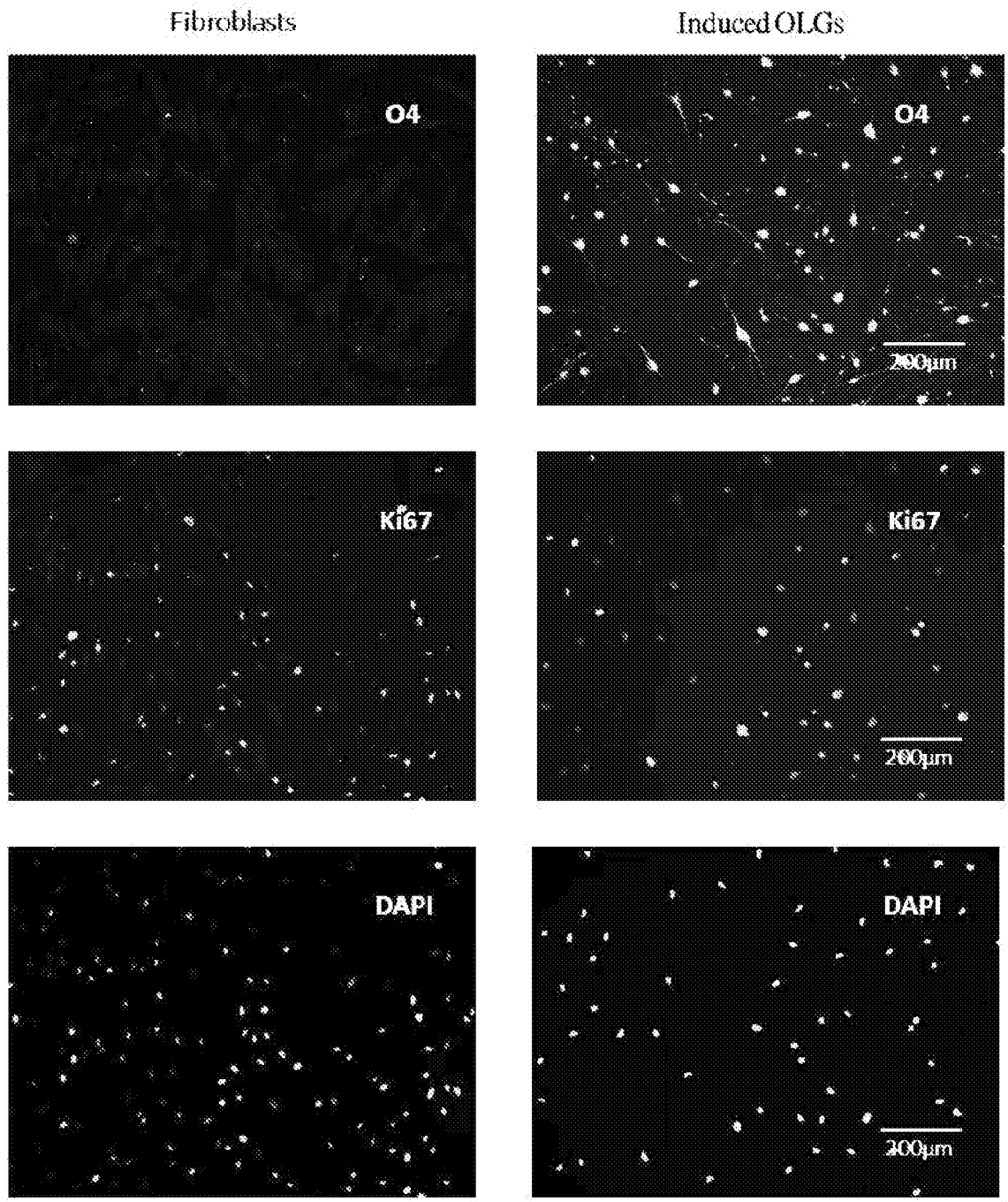
FIG. 11 shows that the induced OLGs have proliferation ability. The immunofluorescence staining showed that O4 positive cells also expressed proliferation indicator Ki67.
Figure 12A:
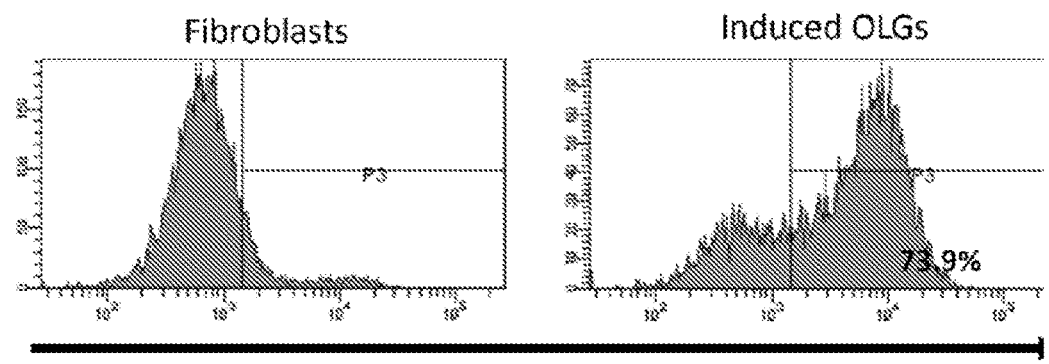
FIG. 12A, 12B and 12C show that the induced OLGs expressed oligodendrocyte progenitor cell marker A2B5 and O4.
Figure 12B:
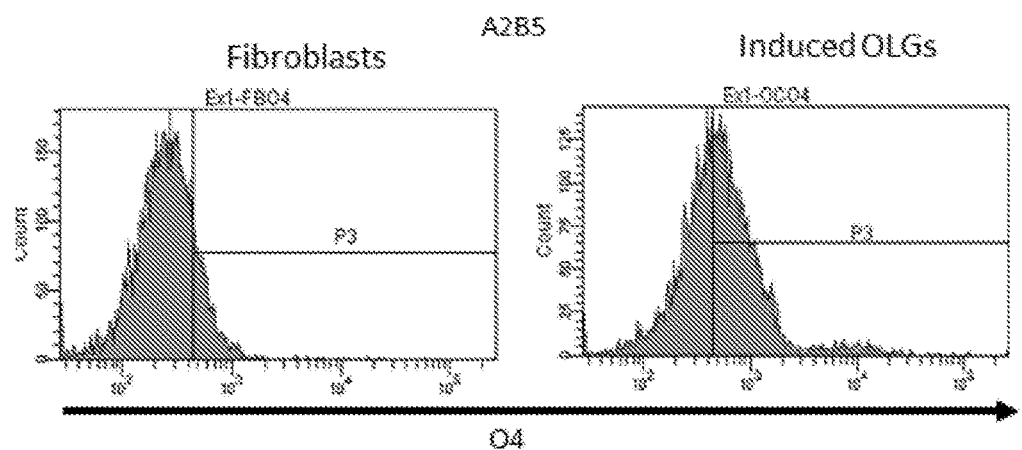
Figure 12C:
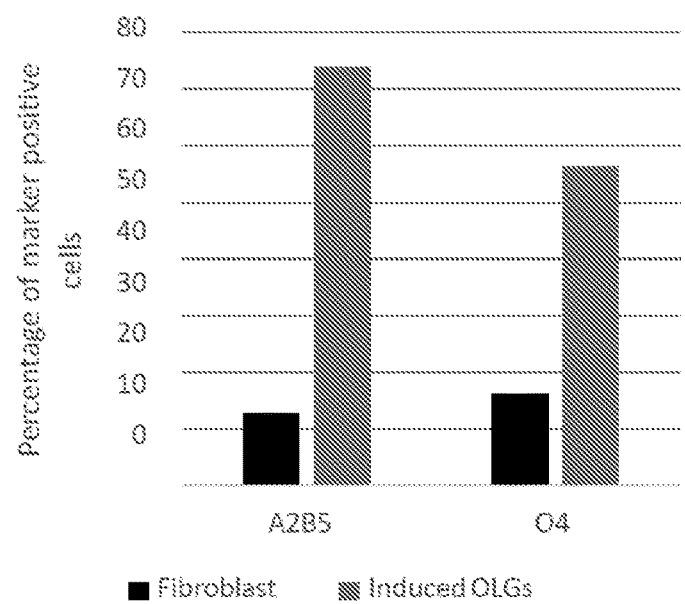

The proliferative ability of induced oligodendrocyte-lineage cells was also investigated. To determine if the induced cells were still expandable with sufficient proliferative ability after we treated with the chemicals, we stained the mitotic marker and detected the expression of Ki67 on the O4-positive induced OLGs (produced from skin cells via treatment with four compounds, 4C (VYSF)). Our discovery suggested that these induced cells expressed Ki67 and equipped with some proliferative ability (FIG. 11). Furthermore, by flow cytometry, we plan to use A2B5 (oligodendrocyte progenitor marker) to isolate the oligodendroglia cells in the early developmental stage. These A2B5-positive cells reach 78% of live cells and were able to expand and expressed the O4 marker upto 56.4% (FIG. 12A, 12B 12C). The results indicated that A2B5-positive cells exhibit oligodendrocyte lineage characteristics and the conversion efficiency is high.

2.5 Using Mocetinostat and Pracinostat to Replace VPA for Generating Induced OLGs.

Figure 13A:
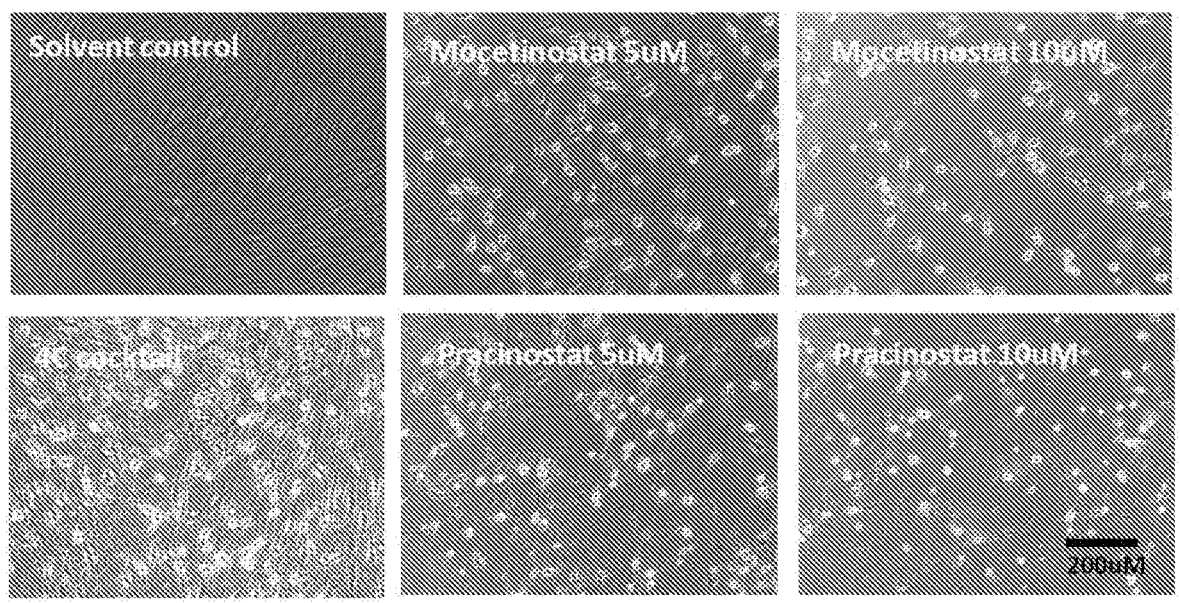
FIG. 13A-13B shows that VPA could be replaced by other HADC inhibitors for generating induced OLGs.
Figure 13B:
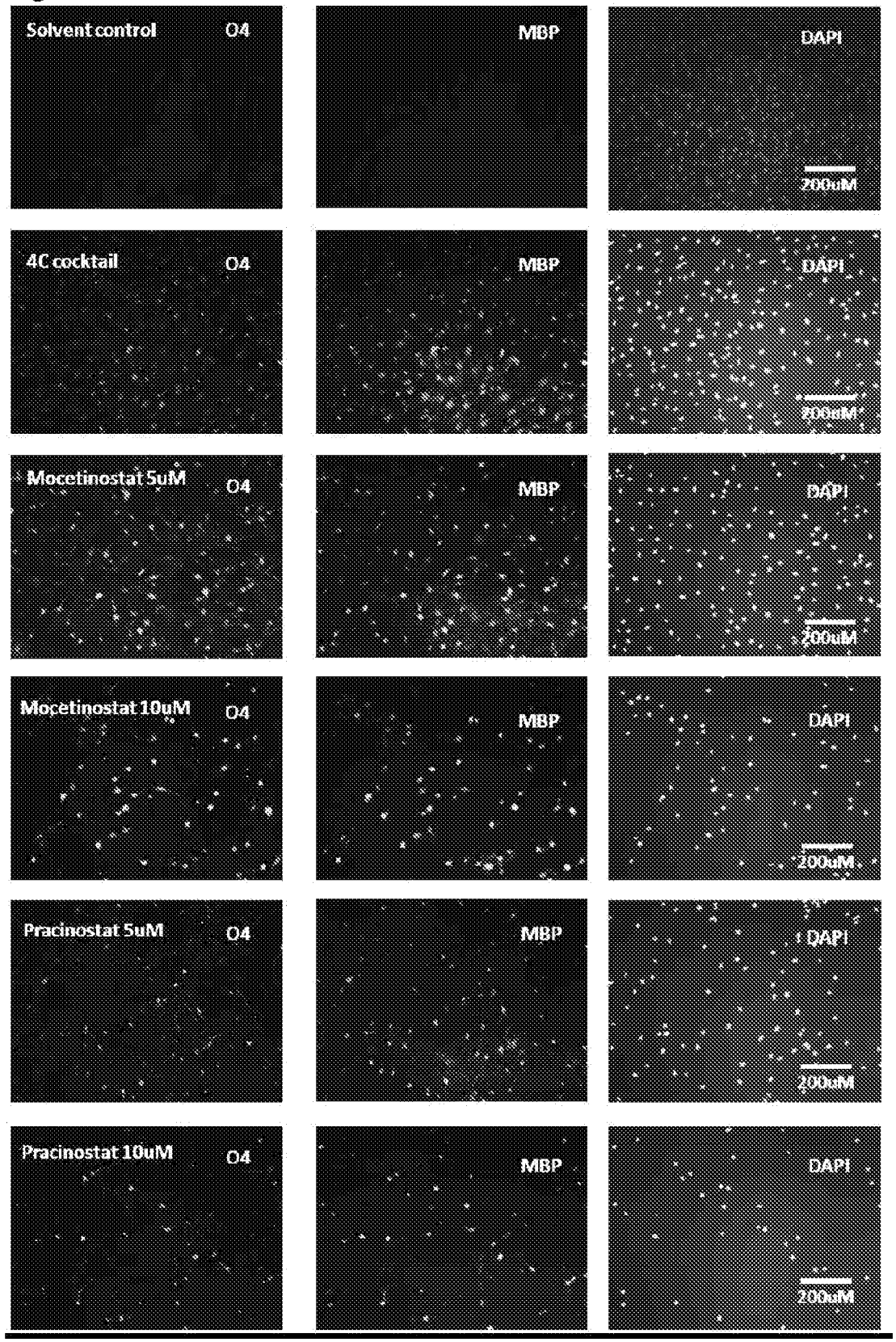

In particular, as VPA, Mocetinostat, and Pracinostat are HDAC inhibitors. We tried to replace VPA with Mocetinostat and Pracinostat at the first step induction. The experimental results indicate that these two HDAC inhibitors can promote the differentiation of fibroblasts to a more mature oligodendroglia morphology with more branched and complicated structure comparing to the original cocktail (FIG. 13A). The immunofluorescence staining results revealed that the cells that treated with these two HDAC inhibitors expressed the oligodendrocyte specific marker O4 and MBP (FIG. 13B).

2.6 Three Chemicals (3C) are Sufficient to Convert Fibroblasts into OLGs.

Figure 14A:
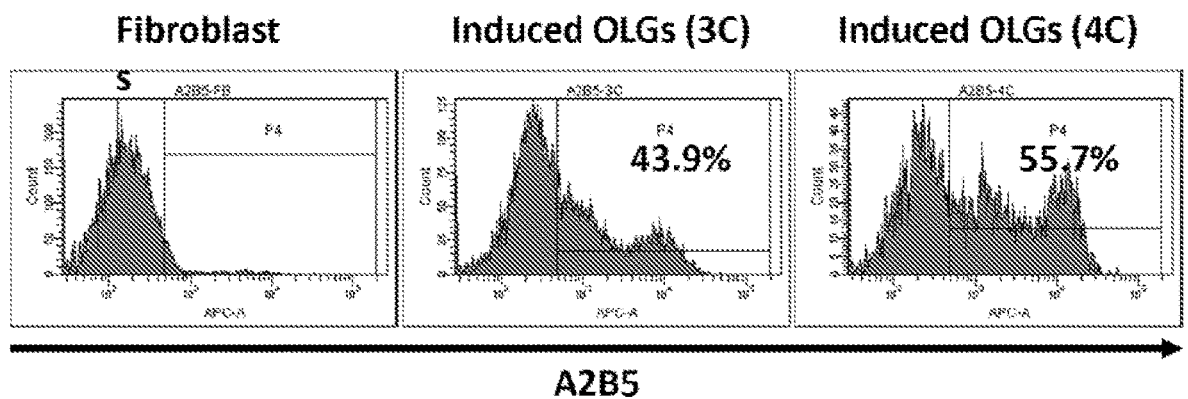
FIGS. 14A and 14B shows that 3C (three compounds) induced iOLGs expressed oligodendrocyte progenitor cell marker A2B5.
Figure 14B:
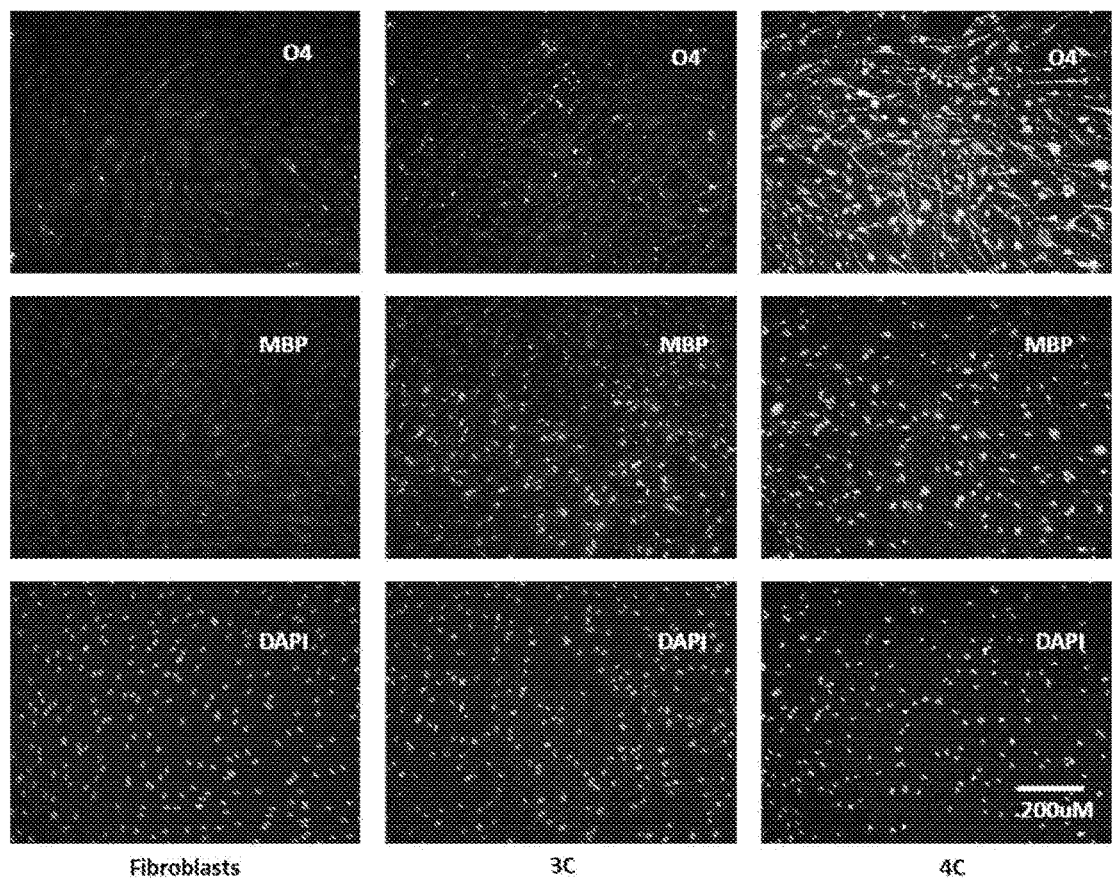
Figure 15:
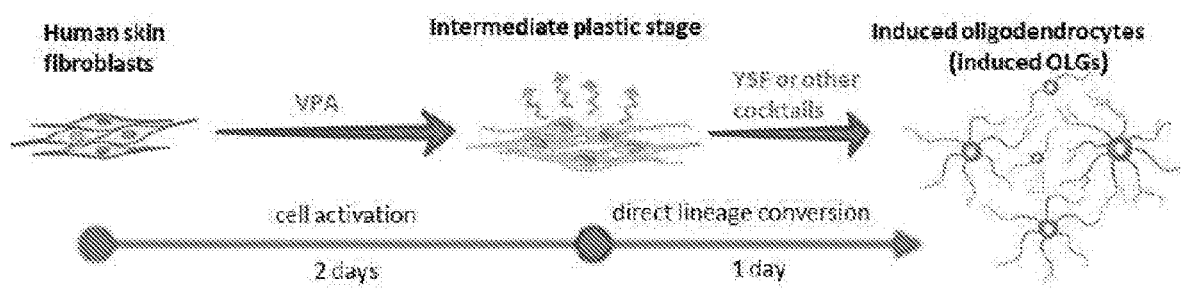
FIG. 15 shows summary of the chemical conversion process of induced OLGs from human skin fibroblasts.

In order to understand which chemicals are a key factor in OLG conversion, we try to test and reduce one or two factors. The experimental results show that the three chemicals contain VPA, Y27632 and FSK can lead to upregulation of OLG-specific markers A2B5 (FIG. 14A), O4 (FIG. 14B), and MBP (FIG. 14B). This suggest that 3C can form induced OLG with lower efficacy.

3. Summary

To sum up, here we demonstrated chemicals Y27632 (a ROCK inhibitor) in combination with VPA (a HDAC inhibitor) and Forskolin (a cAMP activator), optionally further with SU9516 (a CDK inhibitor) or a combination of Y27632 (a ROCK inhibitor) and SU9516 (a CDK inhibitor) can reprogram fibroblasts into induced OLGs with the expression of multiple oligodendrocyte markers. The conversion efficiency is high. The OLG marker O4 positive rate is 56.4% while the A2B5 is 73.9%. These induced OLGs expressing multiple OLG lineage markers are functional and effective in myelinating neurons and thus are useful in cell therapy, in particular for demyelination diseases.

REFERENCE

1. O'Rahilly, R. & Müller, F. Basic human anatomy: a regional study of human structure. (Saunders, Philadelphia; 1983).
2. Purves, D. & Williams, S. M. Neuroscience, Edn. 2nd. (Sinauer Associates, Sunderland, Mass.; 2001).
3. Allen, N.J. & Barres, B. A. Neuroscience: Glia—more than just brain glue. Nature 457, 675-677 (2009).
4. Burns, T. C., Verfaillie, C. M. & Low, W. C. Stem cells for ischemic brain injury: a critical review. J Comp Neurol 515, 125-144 (2009).
5. Thoma, E. C. et al. Chemical conversion of human fibroblasts into functional Schwann cells. Stem Cell Reports 3, 539-547 (2014).
6. Ohara, P. T. et al. Gliopathic pain: when satellite glial cells go bad. Neuroscientist 15, 450-463 (2009).
7. Kier, L. B. & Tombes, R. M. Proton hopping: a proposed mechanism for myelinated axon nerve impulses. Chem Biodivers 10, 596-599 (2013).
8. Bradl, M. & Lassmann, H. Oligodendrocytes: biology and pathology. Acta Neuropathol 119, 37-53 (2010).
9. Inglese, M. Multiple sclerosis: new insights and trends. AJNR Am J Neuroradiol 27, 954-957 (2006).
10. Love, S. Demyelinating diseases. J Clin Pathol 59, 1151-1159 (2006).
11. Lepeta, K. et al. Synaptopathies: synaptic dysfunction in neurological disorders. J Neurochem (2016).
12. Najm, F. J. et al. Drug-based modulation of endogenous stem cells promotes functional remyelination in vivo. Nature 522, 216-220 (2015).
13. Imani, A. & Golestani, M. Cost-utility analysis of disease-modifying drugs in relapsing-remitting multiple sclerosis in Iran. Iran J Neurol 11, 87-90 (2012).
14. Gallo, P., Van Wijmeersch, B. & Paradig, M. S. G. Overview of the management of relapsing-remitting multiple sclerosis and practical recommendations. Eur J Neurol 22 Suppl 2, 14-21 (2015).

15. Compston, A. & Coles, A. Multiple sclerosis. *Lancet* 372, 1502-1517 (2008).
16. Grigoriadis, N., van Pesch, V. & Paradig, M. S. G. A basic overview of multiple sclerosis immunopathology. *Eur J Neurol* 22 Suppl 2, 3-13 (2015).
17. Zoghbi, H. Y & Orr, H. T. Glutamine repeats and neurodegeneration. *Annu Rev Neurosci* 23, 217-247 (2000).
18. Rosas, H. D. et al. Evidence for more widespread cerebral pathology in early HD—An MRI-based morphometric analysis. *Neurology* 60, 1615-1620 (2003).
19. Fennema-Notestine, C. et al. In vivo evidence of cerebellar atrophy and cerebral white matter loss in Huntington disease. *Neurology* 63, 989-995 (2004).
20. Bartzokis, G. et al. Myelin breakdown and iron changes in Huntington's disease: Pathogenesis and treatment implications. *Neurochem Res* 32, 1655-1664 (2007).
21. Di Paola, M. et al. Multimodal MRI Analysis of the Corpus Callosum Reveals White Matter Differences in Presymptomatic and Early Huntington's Disease. *Cereb Cortex* 22, 2858-2866 (2012).
22. Di Paola, M. et al. MRI measures of corpus callosum iron and myelin in early Huntington's disease. *Hum Brain Mapp* 35, 3143-3151 (2014).
23. Phillips, O. et al. Deep White Matter in Huntington's Disease. *Plos One* 9 (2014).
24. Wade, A., Jacobs, P. & Morton, A. J. Atrophy and degeneration in sciatic nerve of presymptomatic mice carrying the Huntington's disease mutation. *Brain Res* 1188, 61-68 (2008).
25. Xiang, Z. M. et al. Peroxisome-Proliferator-Activated Receptor Gamma Coactivator 1 alpha Contributes to Dysmyelination in Experimental Models of Huntington's Disease. *J Neurosci* 31, 9544-9553 (2011).
26. Huang, B. et al. Mutant huntingtin downregulates myelin regulatory factor-mediated myelin gene expression and affects mature oligodendrocytes. *Neuron* 85, 1212-1226 (2015).
27. Kurita, H. et al. Radiation-induced apoptosis of oligodendrocytes in the adult rat brain. *Neurol Res* 23, 869-874 (2001).
28. Oi, S. et al. Brain tumors diagnosed in the first year of life in five Far-Eastern countries. Statistical analysis of 307 cases. *Childs Nerv Syst* 6, 79-85 (1990).
29. Panagiotakos, G. et al. Long-term impact of radiation on the stem cell and oligodendrocyte precursors in the brain. *PLoS One* 2, e588 (2007).
30. Piao, J. et al. Human embryonic stem cell-derived oligodendrocyte progenitors remyelinate the brain and rescue behavioral deficits following radiation. *Cell Stem Cell* 16, 198-210 (2015).
31. Kawabata, S. et al. Grafted Human iPS Cell-Derived Oligodendrocyte Precursor Cells Contribute to Robust Remyelination of Demyelinated Axons after Spinal Cord Injury. *Stem Cell Reports* 6, 1-8 (2016).
32. Tontsch, U., Archer, D. R., Dubois-Dalcq, M. & Duncan, I.D. Transplantation of an oligodendrocyte cell line leading to extensive myelination. *Proc Natl Acad Sci USA* 91, 11616-11620 (1994).
33. Groves, A. K. et al. Repair of demyelinated lesions by transplantation of purified O-2A progenitor cells. *Nature* 362, 453-455 (1993).
34. Guarino, A. T. & McKinnon, R. D. Reprogramming cells for brain repair. *Brain Sci* 3, 1215-1228 (2013).
35. Ogawa, S., Tokumoto, Y, Miyake, J. & Nagamune, T. Immunopanning selection of A2B5-positive cells increased the differentiation efficiency of induced pluripotent stem cells into oligodendrocytes. *Neurosci Lett* 489, 79-83 (2011).
36. Biswas, D. & Jiang, P. Chemically Induced Reprogramming of Somatic Cells to Pluripotent Stem Cells and Neural Cells. *Int J Mol Sci* 17, 226 (2016).
37. Aharonowiz, M. et al. Neuroprotective effect of transplanted human embryonic stem cell-derived neural precursors in an animal model of multiple sclerosis. *PLoS One* 3, e3145 (2008).
38. Mikaeili Agah, E., Parivar, K. & Joghataei, M. T. Therapeutic effect of transplanted human Wharton's jelly stem cell-derived oligodendrocyte progenitor cells (hWJ-MSC-derived OPCs) in an animal model of multiple sclerosis. *Mol Neurobiol* 49, 625-632 (2014).
39. Bulic-Jakus, F., Katusic Bojanac, A., Juric-Lekic, G., Vlahovic, M. & Sincic, N. Teratoma: from spontaneous tumors to the pluripotency/malignancy assay. *Wiley Interdiscip Rev Dev Biol* 5, 186-209 (2016).
40. Najm, F. J. et al. Transcription factor-mediated reprogramming of fibroblasts to expandable, myelinogenic oligodendrocyte progenitor cells. *Nat Biotechnol* 31, 426-433 (2013).
41. Yang, N. et al. Generation of oligodendroglial cells by direct lineage conversion. *Nat Biotechnol* 31, 434-439 (2013).
42. Baer, A. S. et al. Myelin-mediated inhibition of oligodendrocyte precursor differentiation can be overcome by pharmacological modulation of Fyn-RhoA and protein kinase C signalling. *Brain* 132, 465-481 (2009).

What is claimed is:

1. A method of generating induced oligodendrocyte-lineage cells (induced OLGs), comprising
culturing skin fibroblasts in a culture medium for at least one day, wherein the culture medium comprises Y27632 and SU9516 in amounts which allow 30% or more of the skin fibroblasts to reprogram into induced OLGs in one day; wherein induced OLGS express Oligodendrocyte Marker O4.

2. The method of claim 1, wherein the skin fibroblasts are first cultured in a preculture medium which comprises a histone deacetylase (HDAC) inhibitor.

3. The method of claim 2, wherein the culture medium comprising Y27632 and SU9516 further comprises a cyclic adenosine monophosphate (cAMP) activator.

4. The method of claim 3, wherein the HDAC inhibitor is selected from the group consisting of valproic acid (VPA), Mocetinostat and Pracinostat; and the cAMP activator is forskolin (FSK).

5. The method of claim 4, wherein skin fibroblasts are first cultured in the preculture medium comprising 0.2 to 20 mM of VPA, 0.1 to 10 µM of Mocetinostat or 0.1 to 10 µM of Pracinostat, and then cultured in the culture medium comprising 0.5-50 µM of Y27632, 0.5-50 µM of SU9516 and 5 to 500 µM of FSK.

6. The method of claim 5, wherein the skin fibroblasts are first cultured in the preculture medium comprising 0.2 to 20 mM of VPA, 0.1 to 10 µM of Mocetinostat or 0.1 to 10 µM of Pracinosta for 2 days, and then cultured in the culture medium comprising 0.5-50 µM of Y27632, 0.5-50 µM of SU9516 and 5 to 500 µM of FSK for 1 day.

7. The method of claim 4, wherein 50% or more of the skin fibroblasts in the culture are reprogrammed into the induced OLGs in three days wherein the skin fibroblasts are first cultured in the preculture medium for two days and the cultured in the culture medium for one day.

8. The method of claim 2, wherein the HDAC inhibitor is selected from the group consisting of valproic acid (VPA), Mocetinostat and Pracinostat.

9. The method of claim 8, wherein the skin fibroblasts are first cultured in the preculture medium comprising 0.2 to 20 mM of VPA, 0.1 to 10 μM of Mocetinostat or 0.1 to 10 μM of Pracinostat, and then cultured in the culture medium comprising 0.5-50 μM of Y27632 and 0.5-50 μM of SU9516.

10. The method of claim 9, wherein the skin fibroblasts are first cultured in the preculture medium comprising 0.2 to 20 mM of VPA, 0.1 to 10 μM of Mocetinostat or 0.1 to 10 μM of Pracinostat for 2 days, and then cultured in the culture medium comprising 0.5-50 μM of Y27632 and 0.5-50 μM of SU9516 for 1 day.

11. The method of claim 1, wherein the culture medium comprising Y27632 and SU9516 further comprises a cyclic adenosine monophosphate (cAMP)-activator.

12. The method of claim 11, wherein the cAMP activator is forskolin (FSK).

13. The method of claim 1, wherein the skin fibroblasts are human skin fibroblasts.

14. The method of claim 1, further comprising isolating the induced OLGs from the cell culture to obtain an isolated population of induced OLGs.

15. The method of claim 1, wherein the skin fibroblasts are cultured in the culture medium for one day.

16. The method of claim 1, wherein 400 or more of the skin fibroblasts in the culture are reprogrammed into the induced OLGs in one day.

* * * * *